(12) United States Patent
Gao et al.

(10) Patent No.: US 12,184,201 B2
(45) Date of Patent: Dec. 31, 2024

(54) POWER CONVERTER, PHOTOVOLTAIC POWER GENERATION SYSTEM, METHOD, AND APPARATUS

(71) Applicant: Huawei Digital Power Technologies Co., Ltd., Shenzhen (CN)

(72) Inventors: Yongbing Gao, Shanghai (CN); Yunyu Tang, Shanghai (CN); Lei Shi, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 22 days.

(21) Appl. No.: 18/175,583

(22) Filed: Feb. 28, 2023

(65) Prior Publication Data

US 2023/0208312 A1  Jun. 29, 2023

Related U.S. Application Data

(63) Continuation of application No. PCT/CN2021/108583, filed on Jul. 27, 2021.

(30) Foreign Application Priority Data

Sep. 2, 2020 (CN) .......................... 202010910289.6

(51) Int. Cl.
*H02M 7/48* (2007.01)
*H02J 3/38* (2006.01)
(Continued)

(52) U.S. Cl.
CPC .............. *H02M 7/48* (2013.01); *H02J 3/381* (2013.01); *H02M 1/083* (2013.01); *H02M 1/32* (2013.01);
(Continued)

(58) Field of Classification Search
CPC ........ H02S 40/32; H02S 40/36; H02M 1/083; H02M 1/32; H02M 3/04; H02M 3/381; H02M 7/48; H02M 2300/24
(Continued)

(56) References Cited

U.S. PATENT DOCUMENTS

2013/0235629 A1    9/2013  Zhan et al.
2018/0309387 A1*  10/2018  Hosokawa ............ H02M 7/537

FOREIGN PATENT DOCUMENTS

CN   202712870 U   1/2013
CN   101834450 B   7/2015
(Continued)

*Primary Examiner* — Hal Kaplan
(74) *Attorney, Agent, or Firm* — Maier & Maier, PLLC

(57) ABSTRACT

A converter includes a power conversion circuit, a switching device, and a controller, and includes N phases, where N is 2 or 3. An input end of the power conversion circuit is connected to a direct current power supply, and the power conversion circuit converts a direct current output by the direct current power supply into an alternating current. The switching device includes at least the following two stages: a first-stage switching device and a second-stage switching device. The first-stage switching device and the second-stage switching device separately include N switches, and the N switches are connected in series to the N phases respectively. An output end of the power conversion circuit is connected to an alternating current power grid through the first-stage switching device and the second-stage switching device that are connected in series.

20 Claims, 16 Drawing Sheets

(51) Int. Cl.
   *H02M 1/08* (2006.01)
   *H02M 1/32* (2007.01)
   *H02M 3/04* (2006.01)
   *H02S 40/32* (2014.01)
   *H02S 40/36* (2014.01)

(52) U.S. Cl.
   CPC .............. *H02M 3/04* (2013.01); *H02S 40/32* (2014.12); *H02S 40/36* (2014.12); *H02J 2300/24* (2020.01)

(58) Field of Classification Search
   USPC .......................................................... 307/82
   See application file for complete search history.

(56) References Cited

FOREIGN PATENT DOCUMENTS

| | | | |
|---|---|---|---|
| CN | 107086806 A | 8/2017 | |
| CN | 112234645 A | 1/2021 | |
| WO | 2020154842 A1 | 8/2020 | |

* cited by examiner

US 12,184,201 B2

POWER CONVERTER, PHOTOVOLTAIC POWER GENERATION SYSTEM, METHOD, AND APPARATUS

CROSS-REFERENCE TO RELATED APPLICATIONS

This application is a continuation of International Application No. PCT/CN2021/108583, filed on Jul. 27, 2021, which claims priority to Chinese Patent Application No. 202010910289.6, filed on Sep. 2, 2020. The disclosures of the aforementioned applications are hereby incorporated by reference in their entireties.

TECHNICAL FIELD

The embodiments relate to the field of photovoltaic power generation technologies, a power converter, a photovoltaic power generation system, a method, and an apparatus.

BACKGROUND

At present, with increasingly severe environmental pollution, photovoltaic power generation attracts more attention. A photovoltaic power generation system generally converts a direct current from a photovoltaic array into an alternating current and feeds back the alternating current to an alternating current power grid.

As shown in FIG. 1, an example in which an input end of an inverter 100 is connected to a direct current power supply is used. The direct current power supply may be a photovoltaic array or may be a direct current power supply output by a DC-DC converter.

According to a safety regulation requirement, two stages of relays, namely, a first-stage relay (K1, K3, and K5) and a second-stage relay 300 (K2, K4, and K6), are usually connected between an output end of the inverter 100 and an alternating current power grid, to implement functions of grid connection, grid disconnection, system protection, and fault isolation In actual application, a current solution is shown in FIG. 1. In an example, two control signals 200 and 300 are used to turn off respectively the first-stage relay (K1, K3, and K5) and the second-stage relay 300 (K2, K4, and K6) in sequence.

However, the control manner in FIG. 1 has a problem. Details are described below with reference to FIG. 2.

FIG. 2 is a topology diagram of a circuit corresponding to FIG. 1.

For example, an inverter and a power grid each have three phases (A, B, and C).

Before grid connection, K1 to K6 are all turned off, a voltage at a point N on a power grid side and PE are equipotential, and a voltage at a direct current bus neutral point BUS_N on a direct current side of the inverter 100 is determined by a system impedance. Therefore, BUS_N and the point N may be non-equipotential. As shown in FIG. 2, when the power grid is not connected, an alternating current voltage output by the inverter is an alternating current voltage based on BUS_N. At a moment of grid connection, because a voltage on the power grid side is based on point N, there is a common-mode voltage difference between BUS_N and the point N (for example, references for alternating current voltages at two ends of a relay are different). If relays are controlled to turn on in the manner shown in FIG. 1, because a voltage difference exists between two ends of each of the relays at moments when the relays are turned on, there are large impulse currents in the three phases of a stage of relays that are turned on later. This seriously affects a service life of the relay.

SUMMARY

The embodiments may provide a power converter, a photovoltaic power generation system, a method, and an apparatus, to effectively control turn-on of a relay and prolong a service life of the relay.

According to a power converter provided in an embodiment, to implement redundancy and ensure reliable turn-off when the power converter is disconnected from a power grid, two sets of switching devices are usually connected in series between a power conversion circuit and the power grid. When an output end of the power conversion circuit needs to be connected to an alternating current power grid, relays in phases in one group are first turned on, and then the phases of relays in the other group are turned on one by one, to reduce impact on the relays in the phases that are turned on later. The relay may be integrated in the power converter and may be controlled by a controller of the power converter. The power converter may be bidirectional and implements inversion in a forward direction and rectification in a reverse direction. When being applied to an optical storage system, the power converter can charge an energy storage device in the reverse direction. The converter includes a power conversion circuit, a switching device, and a controller. The power converter may include three phases or two phases. An input end of the power conversion circuit is connected to a direct current power supply, and the power conversion circuit converts a direct current output by the direct current power supply into an alternating current. The switching device includes at least the following two stages: a first-stage switching device and a second-stage switching device. The first-stage switching device and the second-stage switching device separately include N switches, and the N switches are connected in series to the N phases respectively. An output end of the power conversion circuit is connected to an alternating current power grid through the first-stage switching device and the second-stage switching device that are connected in series. The controller is configured to: when the power conversion circuit is connected to the alternating current power grid, first control the N switches in the second-stage switching device to be simultaneously turned on, and then sequentially control the N switches in the first-stage switching device to be turned on one by one.

Because a phase that is first turned on connects one phase of the power conversion circuit to one phase of the alternating current power grid, BUS_N on a direct current side of the power conversion circuit is connected to N on an alternating current side sequentially through an interior of the power conversion circuit and the turned-on switches, so that BUS_N and N are equipotential. When a switch in another phase is turned on at this time, the switch in the another phase is avoided from damage of an impulse current caused by a potential voltage difference between BUS_N and N. Therefore, when the power converter is connected to the power grid, impulse currents borne by a part of internal switching devices of the power converter can be reduced, without making the switches in all the phases bear the impulse currents brought by the voltage difference between BUS_N and N when the switches are turned on. In this solution, the switching devices in the N phases are not controlled as a whole to be simultaneously turned on at a time. In addition, to reduce control difficulty and improve controllability, a quantity of control signals is minimized. This may effectively balance decentralized and independent control on the switching devices and reliability. A larger quantity of control signals leads to higher vulnerability to interference and lower control reliability. The switching devices may be controlled as decentrally and independently as possible while stability and reliability are ensured, thereby resolving the problem of a current shock occurring simultaneously in the switching devices in the three phases.

The controller may output N+1 signals to control 2N relays to improve control reliability of the controller. On a premise of performing control by using a minimized quantity of control signals, a smaller quantity of control signals leads to higher control reliability. The controller outputs a first turn-on signal to control the N switches in the second-stage switching device to be simultaneously turned on and then sequentially outputs a second turn-on signal to an $(N+1)^{th}$ turn-on signal to control the N switches in the first-stage switching device to be turned on one by one.

Each switching device may have a life determined by a quantity of turn-on/off times. Therefore, to prolong the life of the switching device, the controller may change a sequence of turning on the N relays. For example, when the power conversion circuit is connected to the alternating current power grid this time, the controller changes a sequence of turning on the N switches in the first-stage switching device one by one.

To reliably turn off the switching device, avoid contact adhesion, and reduce a current shock upon turn-off in a case that the power converter is disconnected from the power grid, when the power conversion circuit is disconnected from the alternating current power grid, the controller may first control, respectively based on output currents in the N phases of the power conversion circuit, the N switches in the first-stage switching device to be turned off one by one, and then may control the N switches in the second-stage switching device to be simultaneously turned off.

The controller may output N+1 signals to control 2N relays to improve control reliability of the controller. On a premise of performing control by using a minimized quantity of control signals, a smaller quantity of control signals leads to higher control reliability. The controller sequentially outputs a first turn-off signal to an $N^{th}$ turn-off signal to control respectively the N switches in the first-stage switching device to be turned off one by one, and then outputs an $(N+1)^{th}$ turn-off signal to control the N switches in the second-stage switching device to be simultaneously turned off.

To reduce a switch loss caused by turn-off of the switching device and ensure reliable turn-off of the switching device, at a zero-crossing moment of a current of each phase, a relay corresponding to the phase may be controlled to be turned off. This avoids contact adhesion and turn-off failure of the relay caused by an excessively large current. For example, at a zero-crossing moment of a current in an $i^{th}$ phase in the output currents in the N phases of the power conversion circuit, the controller controls a switch in the $i^{th}$ phase in the first-stage switching device to be turned off, where i=1, . . . , or N.

As the relay has a turn-off delay during actual control, a turn-off delay time of the relay may be obtained based on an actual application scenario. For example, if there is a time period t1 before the zero-crossing moment of the current, a turn-off delay time td and t1 need to be comprehensively considered to ensure precise control on a turn-off moment of the relay. The delay td may need to be deducted from t1. Based on a preset turn-off delay time for the first-stage switching device and the zero-crossing moment of the current in the $i^{th}$ phase, the controller outputs a turn-off signal to the switch in the $i^{th}$ phase in the first-stage switching device, where the turn-off signal is used to turn off the switch in the $i^{th}$ phase.

An application scenario of controlling turn-off of the switching device may be as follows: When the controller determines that a short circuit fault occurs at the input end or the output end of the power conversion circuit, the controller controls the power conversion circuit to be disconnected from the alternating current power grid.

To reduce space occupied by the switching device and facilitate control, the N switches in the second-stage switching device are integrated inside one housing, and the N switches in the first-stage switching device are separately disposed.

The power converter may further include a DC-DC conversion circuit. In other words, the power converter is a two-stage power converter, an input end of the DC-DC conversion circuit is connected to the direct current power supply, and an output end of the DC-DC conversion circuit is connected to the input end of the power conversion circuit.

An embodiment may further provide a photovoltaic power generation system, including a photovoltaic array and the foregoing power converter. The photovoltaic array is connected to an input end of the power converter.

An embodiment may further provide a method for controlling an action of a switching device, and the method is applied to a power converter. The power converter includes a power conversion circuit and a switching device. The switching device includes at least a first-stage switching device and a second-stage switching device. The power converter includes N phases, where N is 2 or 3. An output end of the power conversion circuit is connected to an alternating current power grid through the first-stage switching device and the second-stage switching device that are connected in series. The first-stage switching device and the second-stage switching device separately include N switches. The method includes: when the power conversion circuit is connected to the alternating current power grid, first controlling the N switches in the second-stage switching device to be simultaneously turned on, and then sequentially controlling the N switches in the first-stage switching device to be turned on one by one.

In this solution, the switching devices in the N phases are not controlled as a whole to be simultaneously turned on at a time. In addition, to reduce control difficulty and improve controllability, a quantity of control signals is minimized. This may effectively balance decentralized and independent control on the switching devices and reliability. A larger quantity of control signals leads to higher vulnerability to interference and lower control reliability. The switching devices may be controlled as decentrally and independently as possible while stability and reliability are ensured, thereby resolving the problem of a current shock occurring simultaneously in the switching devices in the three phases.

The controller may output N+1 signals to control 2N relays to improve control reliability of the controller. On a premise of performing control by using a minimized quantity of control signals, a smaller quantity of control signals leads to higher control reliability. The controlling the N switches in the first-stage switching device to be sequentially turned on one by one may include: when the power conversion circuit is connected to the alternating current power grid this time, changing a sequence of turning on the N switches in the first-stage switching device one by one.

To reliably turn off the switching device, avoid contact adhesion, and reduce a current shock upon turn-off in a case that the power converter is disconnected from the power grid, the method may further include: when the power conversion circuit is disconnected from the alternating current power grid, first sequentially controlling, based on output currents in the N phases of the power conversion circuit, the N switches in the first-stage switching device to be turned off one by one, and then controlling the N switches in the second-stage switching device to be simultaneously turned off.

To reduce a switch loss caused by turn-off of the switching device and ensure reliable turn-off of the switching device, at a zero-crossing moment of a current of each phase, a relay corresponding to the phase may be controlled to be turned off. This avoids contact adhesion and turn-off failure of the relay caused by an excessively large current. The sequentially controlling the N switches in the first-stage switching device to be turned off one by one includes: at a zero-crossing moment of a current in an $i^{th}$ phase in the output currents in the N phases of the power conversion circuit, controlling a switch in the $i^{th}$ phase in the first-stage switching device to be turned off, where i=1, . . . , or N.

As the switching device has a turn-off delay, to more accurately control the switching device to be turned off at the zero-crossing moment of the current of the phase, a turn-off delay time of the switching device may need to be considered. Controlling a switch in the $i^{th}$ phase in the first-stage switching device to be turned off may include: based on a preset turn-off delay time for the first-stage switching device and the zero-crossing moment of the current in the $i^{th}$ phase, outputting a turn-off signal to the switch in the $i^{th}$ phase in the first-stage switching device, where the turn-off signal is used to turn off the switch in the $i^{th}$ phase.

The method may further include: determining whether a short circuit fault occurs at an input end or the output end of the power conversion circuit; and if a short circuit fault occurs at the input end or the output end of the power conversion circuit, controlling the power conversion circuit to be disconnected from the alternating current power grid.

An embodiment may further provide an apparatus for controlling an action of a switching device, and the apparatus is applied to a power converter. The power converter includes a power conversion circuit and a switching device. The switching device includes a first-stage switching device and a second-stage switching device. The power converter includes N phases, where N is 2 or 3. An output end of the power conversion circuit is connected to an alternating current power grid through the first-stage switching device and the second-stage switching device that are connected in series. The first-stage switching device and the second-stage switching device separately include N switches.

The apparatus includes a first turn-on control unit and a second turn-on control unit. The first turn-on control unit is configured to: when the power conversion circuit is connected to the alternating current power grid, first control the N switches in the second-stage switching device to be simultaneously turned on. The second turn-on control unit is configured to: after the N switches in the second-stage switching device are simultaneously turned on, sequentially control the N switches in the first-stage switching device to be turned on one by one.

The apparatus may further include a first turn-off control unit and a second turn-off control unit. The first turn-off control unit is configured to: when the power conversion circuit is disconnected from the alternating current power grid, first sequentially control, based on output currents in the N phases of the power conversion circuit, the N switches in the first-stage switching device to be turned off one by one. The second turn-off control unit is configured to: after the N switches in the first-stage switching device are all turned off, control the N switches in the second-stage switching device to be simultaneously turned off.

An embodiment may further provide an apparatus for controlling an action of a switching device and the apparatus may be applied to a power converter. The power converter includes a power conversion circuit and a switching device. The switching device includes a first-stage switching device and a second-stage switching device. The power converter includes N phases, where N is 2 or 3. An output end of the power conversion circuit is connected to an alternating current power grid through the first-stage switching device and the second-stage switching device that are connected in series. The first-stage switching device and the second-stage switching device separately include N switches.

The apparatus includes a first turn-on control unit and a second turn-on control unit.

The first turn-on control unit is configured to: when the power conversion circuit is connected to the alternating current power grid, first control the N switches in the second-stage switching device to be simultaneously turned on.

The second turn-on control unit is configured to: after the N switches in the second-stage switching device are simultaneously turned on, sequentially control the N switches in the first-stage switching device to be turned on one by one.

The second turn-on control unit includes a replacement subunit.

The replacement subunit is configured to: when the power conversion circuit is connected to the alternating current power grid this time, change a sequence of separately turning on the N switches in the first-stage switching device.

The apparatus provided in this embodiment further includes a first turn-off control unit and a second turn-off control unit.

The first turn-off control unit is configured to: when the power conversion circuit is disconnected from the alternating current power grid, first sequentially control, based on output currents in the N phases of the power conversion circuit, the N switches in the first-stage switching device to be turned off one by one.

The second turn-off control unit is configured to: after the N switches in the first-stage switching device are all turned off, control the N switches in the second-stage switching device to be simultaneously turned off.

The first turn-off control unit may include a current detection subunit and a turn-off control subunit.

The current detection subunit may be configured to detect a zero-crossing moment of a current in an $i^{th}$ phase in the output currents in the N phases of the power conversion circuit.

The turn-off control subunit is configured to: when the current detection subunit detects the zero-crossing moment of the current in the $i^{th}$ phase in the output currents in the N phases of the power conversion circuit, control a switch in the $i^{th}$ phase in the first-stage switching device to be turned off, where i=1, . . . , or N.

The turn-off control subunit may be configured to: based on a preset turn-off delay time and the zero-crossing moment of the current in the $i^{th}$ phase, output a turn-off signal to the switch in the $i^{th}$ phase in the first-stage switching device, where the turn-off signal is used to turn off the switch in the $i^{th}$ phase.

The apparatus provided in this embodiment further includes a determining unit, configured to determine whether a short circuit fault occurs at an input end or the output end of the power conversion circuit. If a short circuit fault occurs at the input end or the output end of the power conversion circuit, the first turn-off control unit and the second turn-off control unit control the power conversion circuit to be disconnected from the alternating current power grid.

Compared with a conventional technology, the embodiments may have the following advantages:

The power converter includes the power conversion circuit, the switching device, and the controller. To implement redundancy and ensure reliable turn-off when the power converter is disconnected from the power grid, two sets of switching devices are usually connected in series between the power conversion circuit and the power grid. When the output end of the power conversion circuit needs to be connected to the alternating current power grid, one stage of switching devices are first controlled to turn on, for example, one set of switching devices corresponding to the three phases are simultaneously turned on. Then, a switch in one phase in the other stage of switching devices is controlled to turn on. Because the phase that is first turned on can connect one phase of the power conversion circuit to one phase of the alternating current power grid, BUS_N on the direct current side of the power conversion circuit is connected to N on the alternating current side sequentially through the interior of the power conversion circuit and the turned-on switches, so that BUS_N and N are equipotential. When a switch in another phase is turned on at this time, the switch in the another phase is avoided from damage of an impulse current caused by a potential voltage difference between BUS_N and N. Therefore, when the power converter is connected to the power grid, impulse currents borne by a part of internal switching devices of the power converter can be reduced, without making the switches in all the phases bear the impulse currents brought by the voltage difference between BUS_N and N when the switches are turned on.

In the embodiments, the switching devices in the N phases are not controlled as a whole to be simultaneously turned on at a time. In addition, to reduce control difficulty and improve controllability, a quantity of control signals is minimized. This may effectively balance decentralized and independent control on the switching devices and reliability. A larger quantity of control signals leads to higher vulnerability to interference and lower control reliability. In the embodiments, the switching devices are controlled as decentrally and independently as possible while stability and reliability are ensured, thereby resolving the problem of a current shock occurring simultaneously in the switching devices in the three phases.

BRIEF DESCRIPTION OF THE DRAWINGS

FIG. 4 is a schematic diagram showing that a part of switching devices corresponding to FIG. 3 are turned on;

DETAILED DESCRIPTION OF THE EMBODIMENTS

Figure 1:
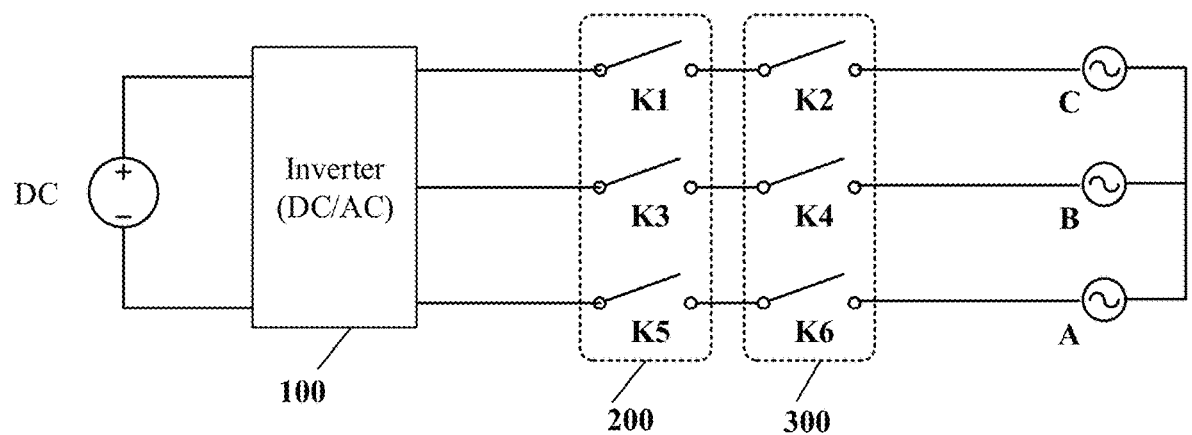
FIG. 1 is a schematic diagram of a connection relationship between an inverter and a power grid in a conventional technology.
Figure 2:
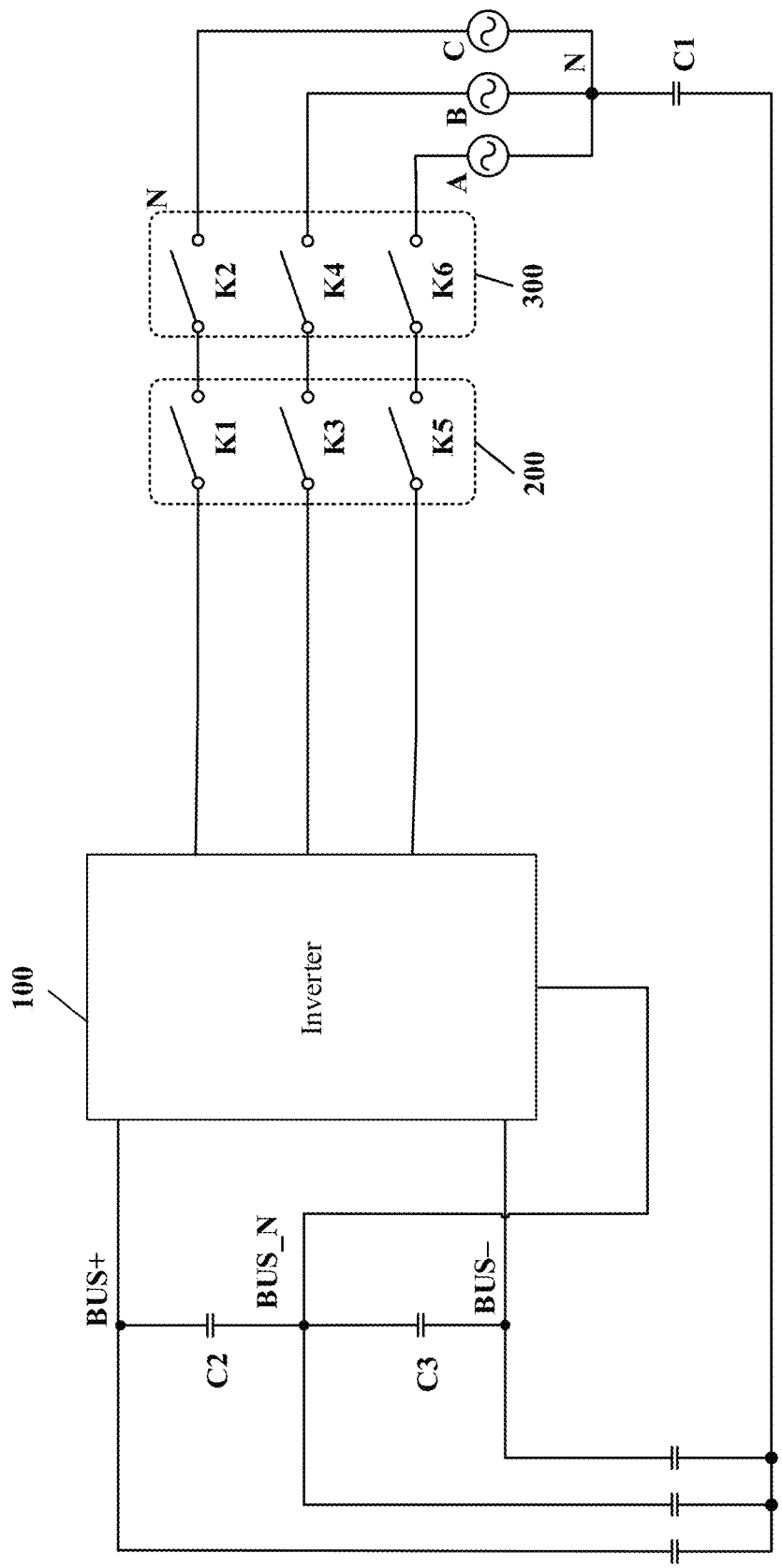
FIG. 2 is a topology diagram of a circuit corresponding to FIG. 1.

A power converter provided in an embodiment may be applied to the field of photovoltaic power generation technologies, or may be applied to another field of power supply technologies. The power converter includes a power conversion circuit, a switching device, and a controller. The power conversion circuit may be bidirectional, and may serve as an inverter circuit in a forward direction and a rectifier circuit in a reverse direction.

To implement redundancy control, two stages of switching devices are usually disposed between the power converter and an alternating current power grid. Two stages of switching devices may be connected in series between the power converter and the alternating current power grid. In this way, when the power conversion circuit needs to be disconnected from the alternating current power grid, if a switching device at one stage is faulty, a switching device at the other stage can act reliably, thereby effectively disconnecting the power converter from the alternating current power grid.

In this embodiment, the switching device may be a relay, a circuit breaker, a contactor, an IGBT, or the like. This is not limited. In an actual product, to facilitate control and reduce a product volume, the switching device and the inverter circuit may be integrated inside a housing of an inverter.

In current control, first-stage switching devices in the two stages of switching devices are packed as a whole for control, and second-stage switching devices are packed as a whole for control. In other words, two independent control signals are output to control the first-stage switching device and the second-stage switching device respectively. However, because each stage of switching devices include switches connected in series in N phases, the switches in the N phases need to act simultaneously. For example, if N is 3, a corresponding inverter is a three-phase inverter. At a moment when the switching devices are turned on, the three switching devices in the three phases simultaneously encounter a relatively large current shock.

The switches in the N phases may not be controlled as a whole at a time. In addition, to reduce control difficulty and improve controllability, a quantity of control signals is minimized, to effectively balance decentralized and independent control on the switching devices and reliability, because a larger quantity of control signals leads to higher vulnerability to interference and lower stability. The switching devices may be controlled as decentrally as possible while stability and controllability are ensured, thereby resolving the problem of a current shock occurring simultaneously in the switching devices in the three phases.

To make a person skilled in the art better understand the embodiments, the following provides descriptions with reference to the accompanying drawings.

First, an embodiment may provide a power converter. An input end of the power converter is connected to a direct current, and an output end of the power converter is connected to an alternating current. The power converter may be a bidirectional converter. In other words, the power converter may convert a direct current into an alternating current. For example, the power converter converts a direct current output by a photovoltaic array into an alternating current and feeds back the alternating current to an alternating current power grid. In addition, a photovoltaic power generation scenario is still used as an example. At night when there is no sunlight, the photovoltaic array does not output electric energy. In this case, the power converter may work in a reverse charging state. The power converter may convert an alternating current of the alternating current power grid into a direct current to charge an energy storage device. In other words, the power converter is applied to an optical storage field. A power conversion circuit in the power converter can implement both inversion in a forward direction and rectification in a reverse direction.

An input end of the power conversion circuit has a direct current voltage neutral point, and a point N of the alternating current power grid is located on an alternating current side. There is a common-mode voltage difference between neutral-point voltages on a direct current side and the alternating current side.

Power Converter Embodiment 1

Figure 3:
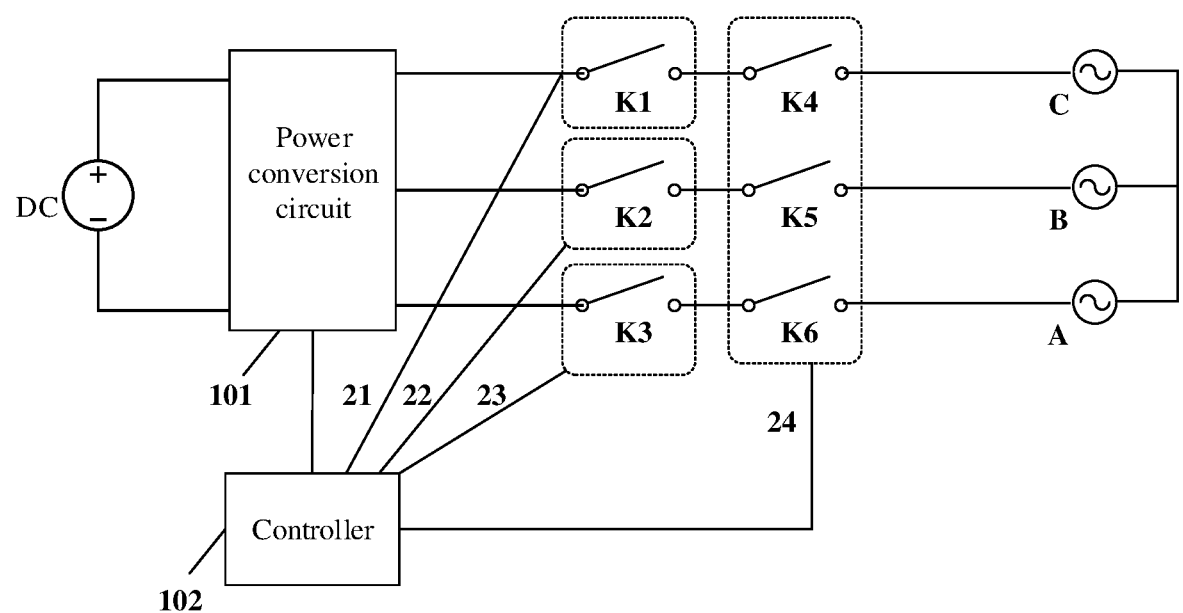
FIG. 3 is a schematic diagram of an inverter according to an embodiment.

FIG. 3 is a schematic diagram of a power converter according to this embodiment.

The power converter provided in this embodiment includes a power conversion circuit 101, a switching device, and a controller 102.

Power conversion includes N phases, where N is 2 or 3. In this embodiment, N is 3. A three-phase power converter and a three-phase alternating current power grid may be used as examples.

An input end of the power conversion circuit 101 is connected to a direct current power supply and converts a direct current output by the direct current power supply into an alternating current.

The switching device includes at least the following two stages: a first-stage switching device and a second-stage switching device.

The first-stage switching device includes a first switch to an $N^{th}$ switch, and the second-stage switching device includes an $(N+1)^{th}$ switch to a $2N^{th}$ switch.

As shown in the figure, in the three-phase power converter, the first-stage switching device includes K1, K2, and K3, and the second-stage switching device includes K4, K5, and K6. K1 and K4 are connected in series in a phase C, K2 and K5 are connected in series in a phase B, and K3 and K6 are connected in series in a phase A.

Locations of the first-stage switching device and the second-stage switching device may be interchanged. In the figure, the first-stage switching device is close to an output end of the power conversion circuit 101, or the second-stage switching device may be close to the output end of the power conversion circuit 101. In other words, the output end of the power conversion circuit 101 is connected to the alternating current power grid through the first-stage switching device and the second-stage switching device that are connected in series.

When the power conversion circuit 101 is connected to the alternating current power grid, the controller 102 first controls, by using a first control signal 24, the second-stage switching device (K4 to K6) to be turned on, and then sequentially controls the N switches in the first-stage switching device to be turned on one by one.

However, a sequence of turning on the N switches in the first-stage switching device is not limited in this embodiment. For example, when the power conversion circuit 101 needs to be connected to the alternating current power grid this time, a control signal 21 may be used to control K1 to be turned on first, then a control signal 22 may be used to control K2 to be turned on, and finally a control signal 23 may be used to control K3 to be turned on.

When the power conversion circuit 101 needs to be connected to the alternating current power grid next time, K2 may be controlled to turn on first, then K3 may be controlled to turn on, and finally K1 may be controlled to be turned on. No enumeration is provided herein. A purpose of such control is to control one switch in K1 to K3 to be first turned on in turn, so that the switch turned on for the first time bears a relatively large impulse current. In this way, the three switches are first turned on in turn to bear the impulse current in turn, instead of making one of the switches bear the impulse current each time. Therefore, an average life of the three switches can be prolonged.

To make a person skilled in the art better understand the embodiment, the following provides a description by using an example in which the power converter is an inverter and the power conversion circuit in the power converter is an inverter circuit.

Figure 4:
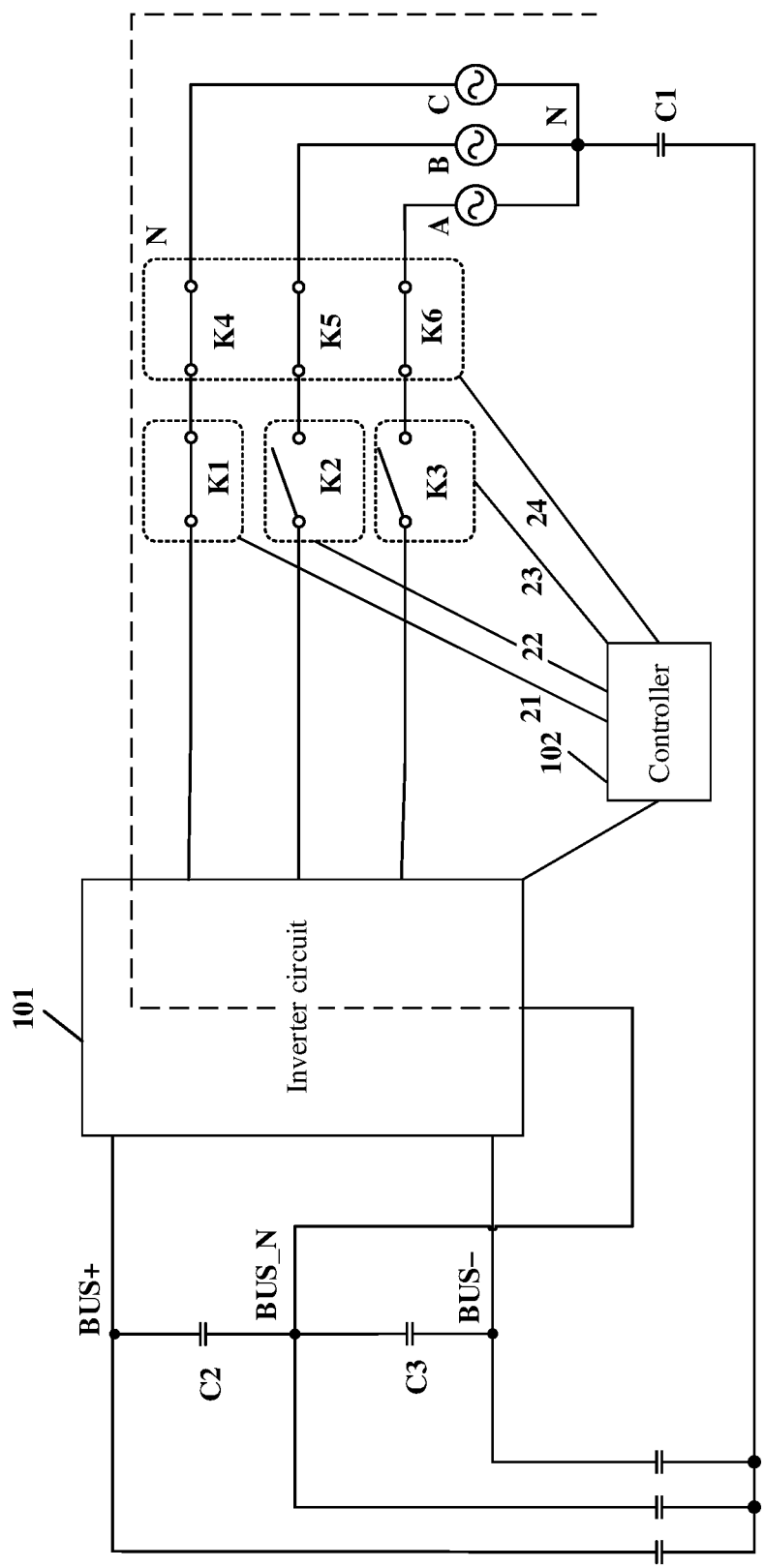

With reference to FIG. 4, the following describes this embodiment.

In an example shown in FIG. 4, the first-stage switching device may be first turned on, K4 to K6 may be simultaneously turned on because K4 to K6 are corresponding to a same control signal 24; and in the first-stage switching device, K1 may be first turned on, and then K2 and K3 may be sequentially turned on. In FIGS. 4, K2 and K3 are still in a turn-off state.

For the phase C, because K4 and K1 are turned on, a phase C of the alternating current power grid is already connected to a phase C of the inverter circuit 101. In addition, because the inverter circuit 101 is already enabled, BUS_N on a direct current side of the inverter circuit 101 is connected to N on an alternating current side sequentially through an interior of the inverter circuit 101, K1, and K4, so that BUS_N and N are equipotential. At this time, K2 and K3 are turned on. When being turned on, K2 and K3 do not bear an impulse current caused by a voltage difference between BUS_N and N. In conclusion, according to this embodiment, impulse currents borne by a part of switching devices can be reduced, without making all switches in the first-stage switching device bear the impulse current brought by the voltage difference when the switches are turned on.

A service life of a switching device may be calculated based on a quantity of actions. A larger quantity of actions indicates a shorter service life. Therefore, controlling each switch in the first-stage switching device to be first turned on in turn can prolong the service life of the switches.

In the following embodiments, an example in which a switching device is a relay is used for ease of description.

Figure 5:
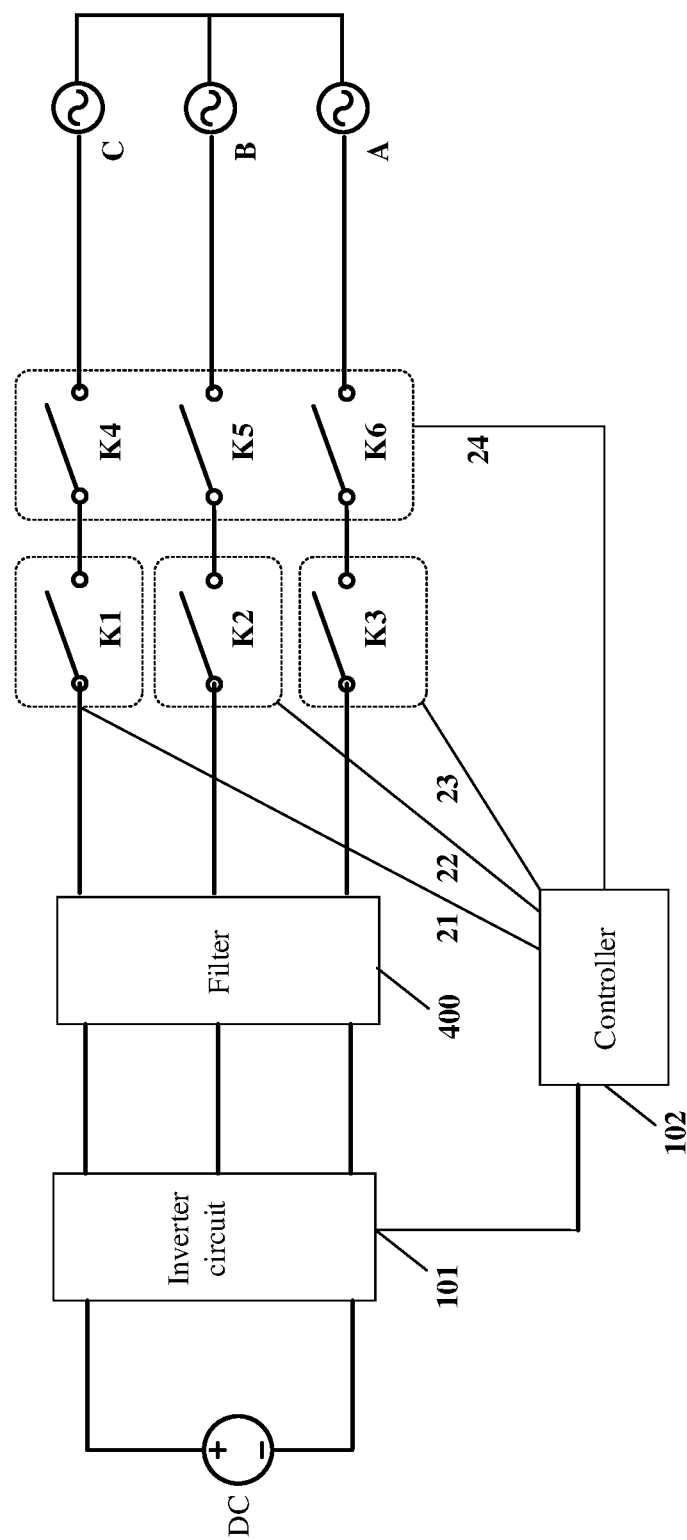
FIG. 5 is a schematic diagram of an inverter including a filter according to an embodiment.

In addition, the inverter may further include a filter. FIG. 5 is a schematic diagram of an inverter including a filter according to an embodiment.

During implementation, the inverter circuit 101, the filter 400, and the relays K1 to K6 are all integrated inside the inverter.

The filter 400 filters a voltage and a current that are output by the inverter circuit 101 and feeds back the voltage and the current to the alternating current power grid.

In conclusion, during relay turn-on, the inverter provided in this embodiment may first control K4 to K6 to be simultaneously turned on, and then may use three different signals to sequentially control K1 to K3 to be turned on. A sequence of K1 to K3 is not limited, but K1 to K3 need to be turned on at different moments.

Power Converter Embodiment 2

When a short circuit fault occurs in a photovoltaic system, this embodiment may further resolve a problem caused by the short circuit fault. The following analyzes the problem caused by the short circuit fault in detail with reference to the accompanying drawings.

Figure 6:
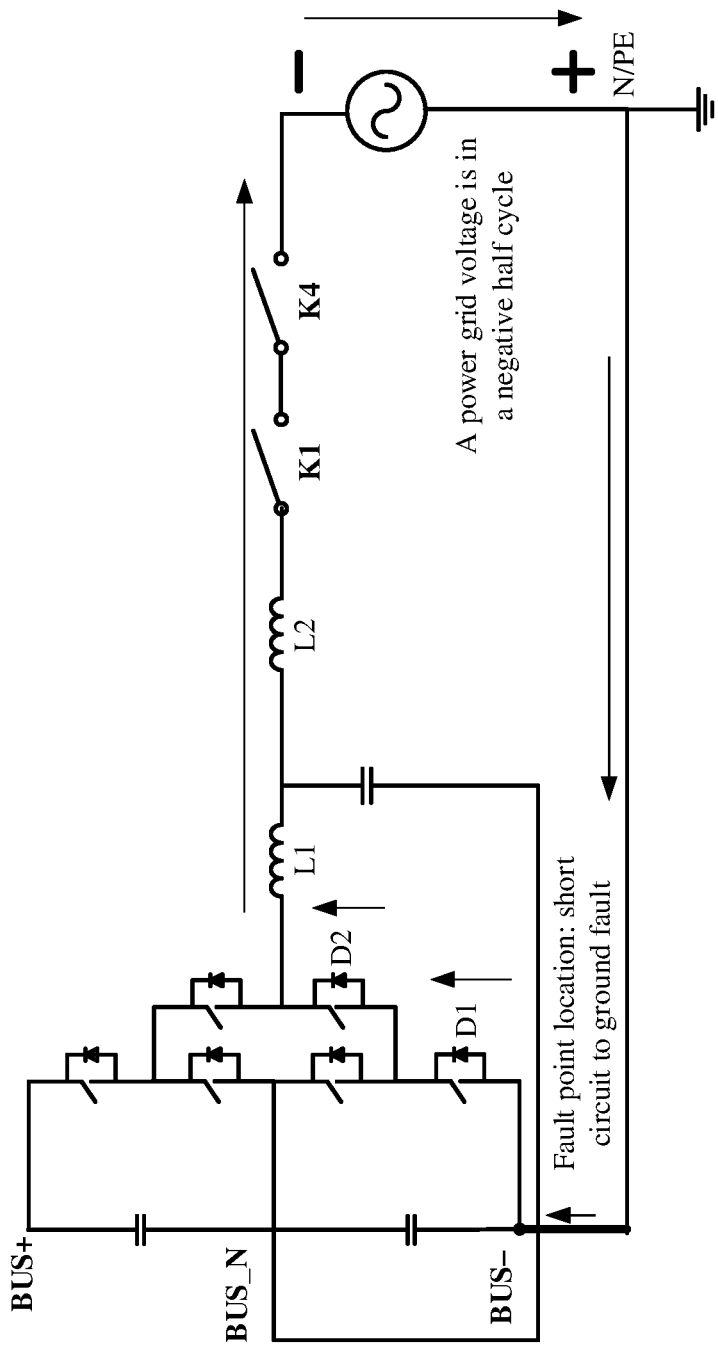
FIG. 6 is a schematic diagram of a short circuit fault on a three-level inverter according to an embodiment.

FIG. 6 is a schematic diagram of a short circuit fault according to an embodiment.

For brief description, a circuit diagram corresponding to only one phase is shown in FIG. 6. In FIG. 6, an example in which an inverter circuit is a three-level inverter circuit is used for description.

When a point N on a power grid side is connected to PE, a location of the short circuit fault is a cable-to-ground short circuit fault at BUS−.

If a power grid voltage of a phase is in a negative half cycle, that is, is a negative voltage, a PE potential is positive relative to the power grid voltage. A loop is formed by using a connection to body diodes (D1 and D2) of switching transistors in the three-level inverter circuit through BUS− and by passing through inductors (L1 and L2) and relays (K1 and K4). As the voltage is relatively high and a current increases rapidly, the relays need to be turned off at this time for protection, so as to prevent the fault from further spreading.

However, if relays in three phases in second-stage switching device is controlled to be simultaneously turned off, because there is a misphase between currents in the three phases and also a misphase between voltages in the three phases (in other words, it is impossible for the phases to be the same), simultaneously turning off the relays in three phases easily causes contact adhesion when a current in a phase is relatively small or crosses zero and currents in the other two phases are relatively large. As a result, the relays cannot be completely turned off, further spreading the fault. Therefore, when the relays in the three phases are controlled by linkage to be simultaneously turned off, turn-off capabilities of the relays are limited.

For the foregoing problem, in this embodiment, the three phases may be sequentially disconnected, instead of being simultaneously disconnected. This can ensure that when a current of each phase is relatively small, a relay in the phase is turned off, thereby avoiding contact adhesion of the relay caused by an excessively large current.

Figure 7:
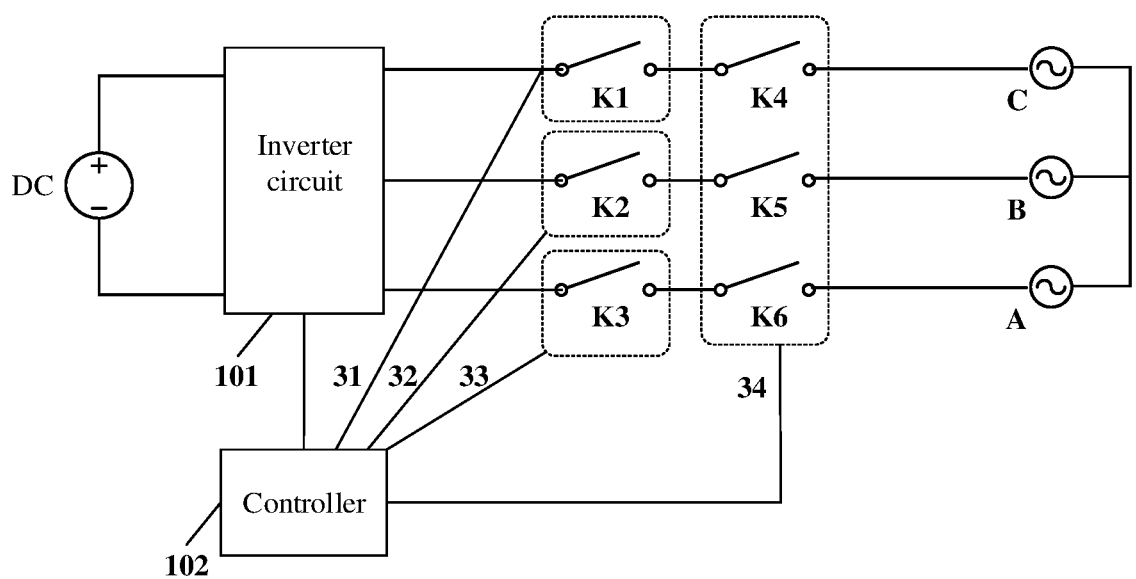
FIG. 7 is a schematic diagram of another inverter according to an embodiment.

FIG. 7 is a schematic diagram of another inverter according to an embodiment.

The following still uses the three-phase power grid as an example.

The controller 102 is further configured to: when the inverter circuit 101 is disconnected from the alternating current power grid, first sequentially control, based on output currents in the N phases of the inverter circuit, the N switches in the first-stage switching device to be turned off (K1 to K3 are sequentially turned off, and a sequence of turning off K1 to K3 is not limited). A relay of a phase may be controlled to turn off only when a current corresponding to the phase is smaller than a preset current value and all the three phases may be controlled in this manner. Because the relays in the three phases are separately controlled, the relay in each phase is turned off when the current is relatively small, so that the relay can be successfully turned off without causing contact adhesion due to an excessively large current. Then, N switches in the second-stage switching device may be controlled to be turned off, and K4 to K6 may be controlled to be simultaneously turned off first.

Similar to a case that the relays in the three phases are turned on, in this embodiment, N+1 control signals are also included. When there are three phases, four control signals may be used to control the relays in the three phases to be turned off. The controller 102 is configured to sequentially output a second turn-off signal to an $(N+1)^{th}$ turn-off signal, that is, turn-off signals 31 to 33, to control respectively the N switches (K1 to K3) in the first-stage switching device to be turned off. Turn-off timings of K1 to K3 may be determined based on the currents of the corresponding phases. A corresponding relay is controlled to turn off when the current is small. Then, a first turn-off signal 34 is output to control all the N switches in the second-stage switching device to be turned off (that is, all of K4 to K6 are turned off).

Although turn-off signals in FIG. 7 are 31 to 34, and turn-on signals in the figure are 21 to 24, in actual implementation, the controller 102 may include four interfaces (for example, I/O interfaces) connected to the relays. During control of turn-on/off states of the relays, the four interfaces may output different signal states for turn-on and turn-off. For example, when the interface outputs a high-level signal, a relay is controlled to turn on correspondingly; and when the interface outputs a low-level signal, a relay is controlled to turn off correspondingly. A first interface is connected to the second-stage switching device to perform linked control on the second-stage switching device. A second interface to a fourth interface are connected to K1 to K3 in the first-stage switching device respectively, and the three relays K1 to K3 are controlled respectively by using the three interfaces, that is, the second interface to the fourth interface.

At a zero-crossing moment of a current in an $i^{th}$ phase in the N phases, the controller 102 controls a switch in the $i^{th}$ phase in the first-stage switching device to be turned off, where i=1, . . . , or N.

For the ground fault at BUS−, a short circuit current has a same phase as the power grid voltage. Therefore, a zero-crossing point of the current basically coincides with a zero-crossing point of the voltage. The relay can be controlled to turn off by detecting the zero-crossing point of the voltage, or the relay can be controlled to turn off by detecting the zero-crossing point of the current. A detection location may be at an output end of the inverter circuit.

As the relay has a turn-off delay during actual control, a turn-off delay time of the relay may be obtained based on an actual application scenario. For example, if there is a time period t1 before the zero-crossing moment of the current, a turn-off delay time td and t1 need to be comprehensively considered to ensure precise control on a turn-off moment of the relay. The delay td may need to be deducted from t1.

The turn-off delay time of the relay may be tested based on the actual application scenario and set based on an empirical value obtained in the test.

Therefore, to control the turn-off moment of the relay more precisely, the controller 102 outputs, based on a preset turn-off delay time and the zero-crossing moment of the current in the $i^{th}$ phase, a turn-off drive signal to the switch in the $i^{th}$ phase in the first-stage switching device, where the turn-off drive signal is used to turn off the switch in the $i^{th}$ phase.

When determining that a short circuit fault occurs at an input end or the output end of the inverter circuit, the controller 102 controls the inverter circuit to be disconnected from the alternating current power grid, to prevent the short circuit fault from being spread to the power grid.

Figure 8:
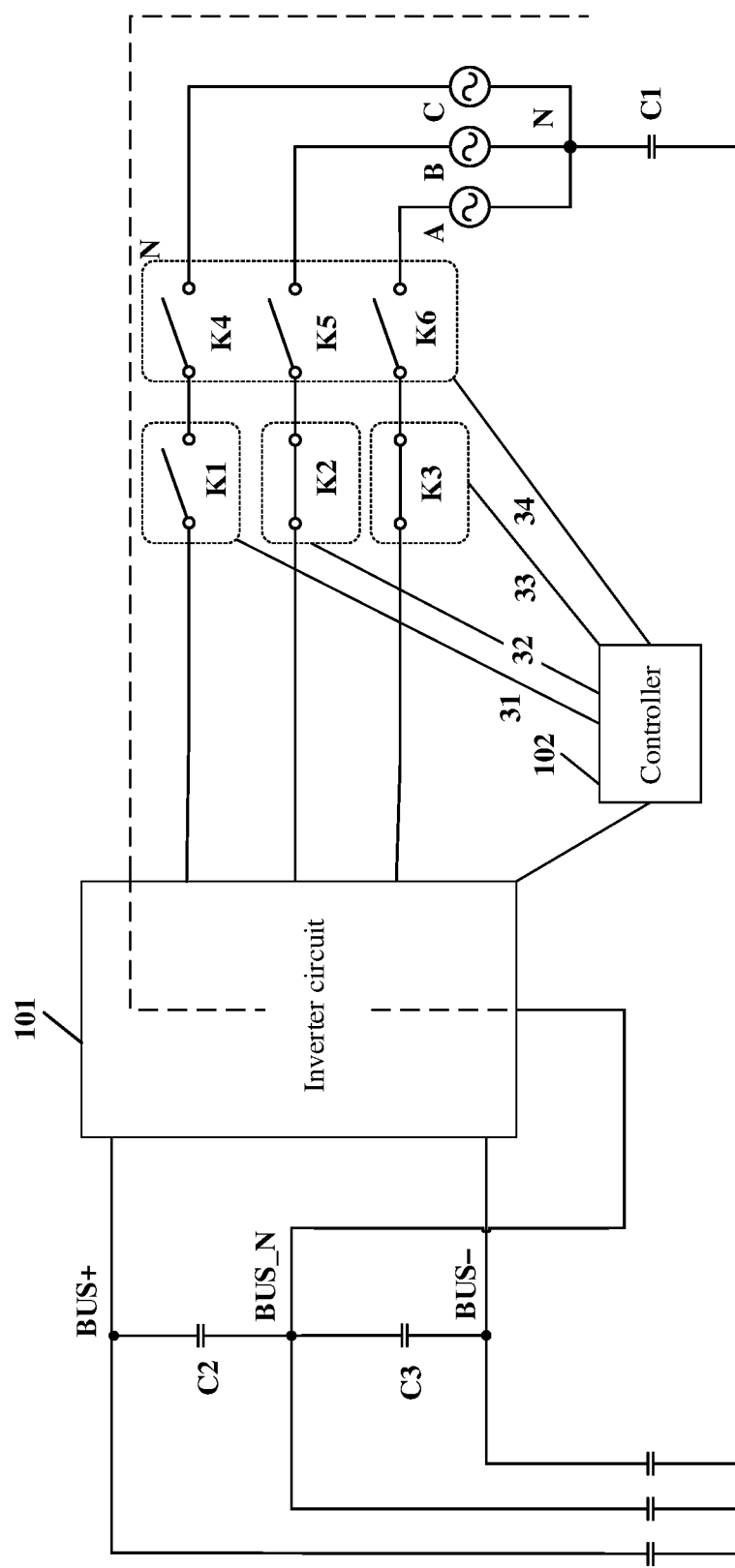
FIG. 8 is a schematic diagram showing that a switching device is turned off according to an embodiment.

As shown in FIG. 8, when a short circuit fault occurs, a zero-crossing moment of a current in each phase is first determined. For example, a current in the phase C crosses zero first, that is, K1 is turned off. Then, zero-crossing moments in a phase A and a phase B continue to be determined, and based on the zero-crossing moments, K2 or K3 is controlled to be turned off. For example, if zero crossing occurs in the phase A next, K3 is turned off. K2 is turned off in the same way. Then, K4 to K6 are simultaneously turned off. At this point, all relays are turned off, and the inverter is completely disconnected from the alternating current power grid.

In this embodiment, separate signals may be used to control one stage of switching devices. Therefore, at the zero-crossing moment of the current in each phase, a relay corresponding to the phase may be precisely controlled to be turned off. This avoids contact adhesion and turn-off failure of the relay caused by an excessively large current.

Power Converter Embodiment 3

The foregoing describes the three-phase power converter. This embodiment may also be applied to a two-phase power converter. The following describes the two-phase power converter in detail with reference to the accompanying drawings.

Figure 9:
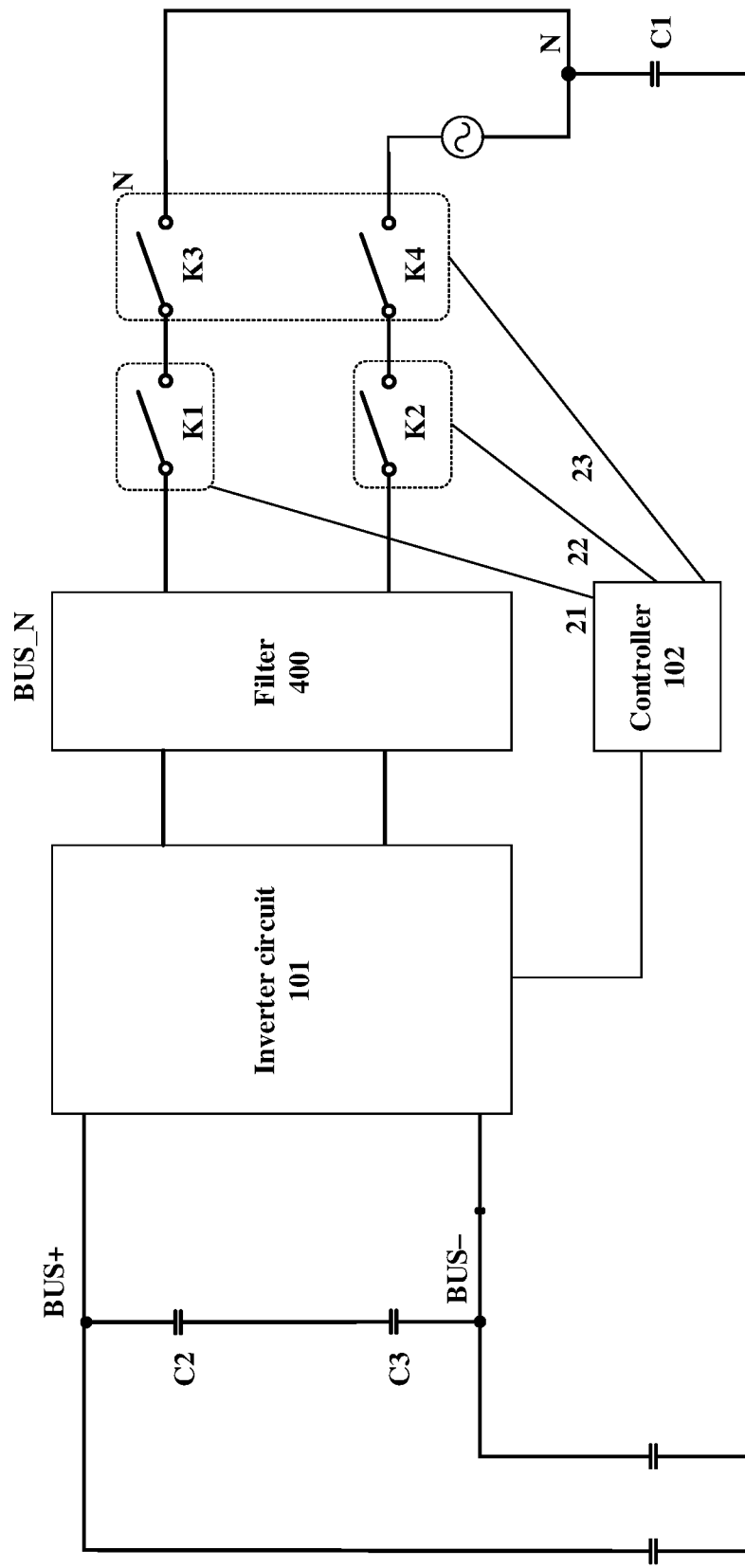
FIG. 9 is a schematic diagram of a two-phase inverter according to an embodiment.

FIG. 9 is a schematic diagram of a two-phase power converter according to an embodiment.

An example in which the power converter is an inverter and an output end of the inverter includes a filter is used for description.

It can be seen from FIG. 9 that, when both the inverter and a power grid are two-phase, an output end of an inverter circuit 101 is connected to the power grid sequentially through a filter 400, a first-stage switching device, and a second-stage switching device.

The output end of the inverter circuit 101 is connected to direct current bus capacitors C1 and C2. A direct-current-side input end of the inverter circuit 101 is a direct current bus, and BUS+ and BUS− correspond to a positive input end and a negative input end of the inverter circuit 101 respectively.

The foregoing short circuit fault in the case of three phases may also exist between a point N of the alternating current power grid and BUS− at the input end of the inverter circuit 101. For details, refer to the description of the three-phase inverter embodiment. Details are not described herein again.

The following first describes a working principle of controlling the switching device to turn on.

Figure 10:
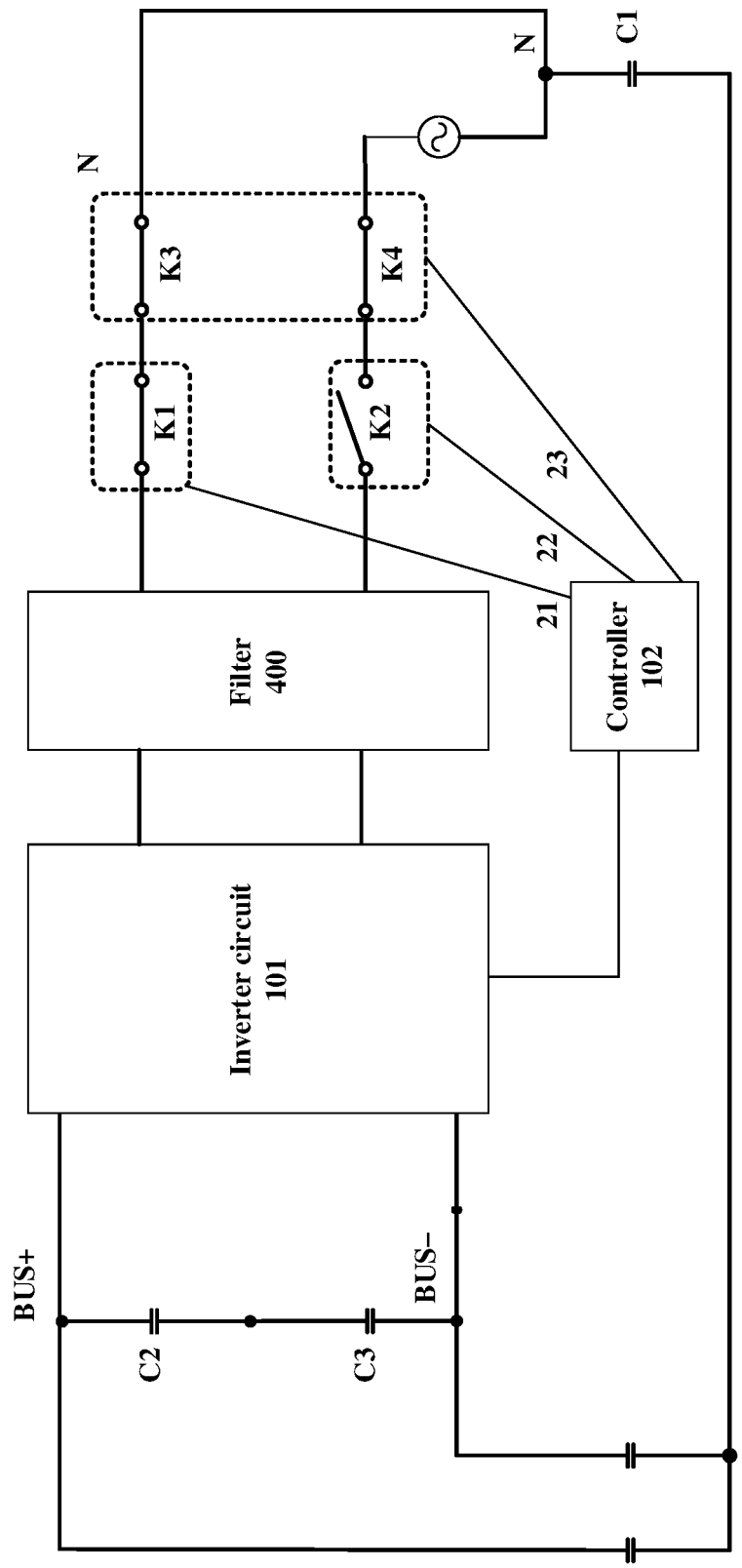
FIG. 10 is a schematic diagram showing that a switching device is controlled to turn on according to an embodiment.

FIG. 10 is a schematic diagram showing that a switching device is controlled to turn on according to an embodiment.

The first-stage switching device includes K1 and K2, and the second-stage switching device includes K3 and K4. When the inverter needs to be connected to the power grid, a controller 102 may control one stage of switching devices to be turned on, may control the second-stage switching device to be turned on and may use a control signal 23 to control, by linkage, K3 and K4 to be simultaneously turned on. Then, the controller 102 uses control signals 21 and 22 to control respectively K1 and K2 to be sequentially turned on. K1 may be turned on first and K2 may be turned on later. When the inverter is controlled to be connected to the power grid next time, a sequence of turning on K1 and K2 may be changed. For example, K1 is turned on first, and K2 is turned on later.

Because K3 and K4 are already turned on and K1 is also turned on, when K2 is turned on, two ends of K2 do not need to bear an impact of a large voltage difference, thereby reducing damage to K2 and prolonging a life of K2. Similarly, when K2 is first turned on and K1 is turned on later, a life of K1 may be prolonged. K1 and K2 may alternately be used as a switching device that is first turned on.

In this embodiment, because the inverter is two-phase, the controller 102 needs to output three independent control signals. Three turn-on signals are correspondingly output, for example, 21, 22, and 23 in the figure, to turn on the switching device.

For a case that the switching device needs to be turned off, an example in which the switching device needs to be turned off when a short circuit to ground fault occurs is used for description. This is also applicable to other scenarios in which a switching device needs to be turned off.

Figure 11:
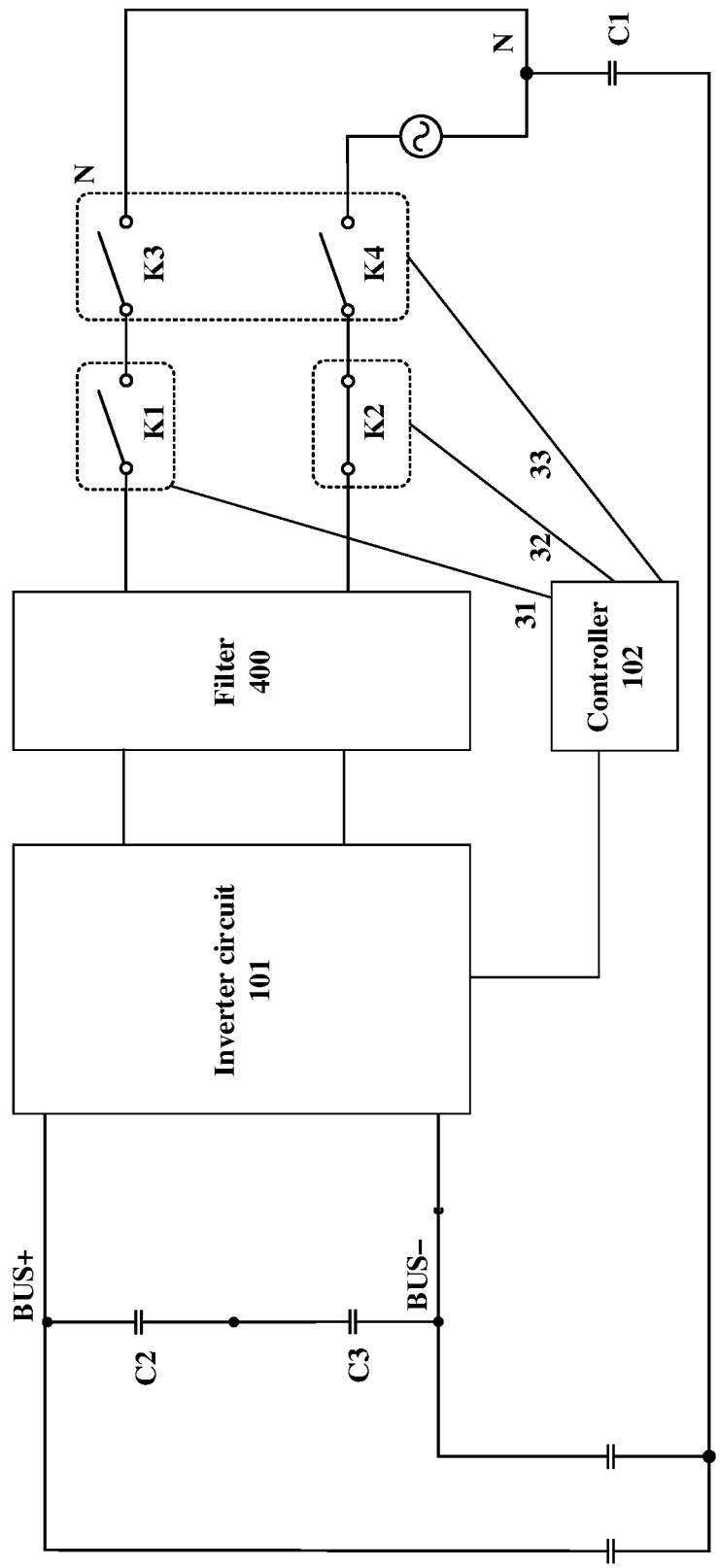
FIG. 11 is a schematic diagram showing that a switching device corresponding to two phases are turned off according to an embodiment.

FIG. 11 is a schematic diagram showing that a switching device corresponding to two phases are turned off according to an embodiment.

The following uses an example in which the switching device needs to be turned off when a short circuit fault occurs and the switching device is a relay for description.

The controller 102 outputs three independent turn-off signals 31, 32, and 33. At a zero-crossing moment of a current of a phase, the controller 102 first outputs the turn-off signal 31 to control K1 to be turned off, to ensure that K1 is effectively turned off and no contact adhesion occurs in K1 due to an excessively large current. Then, the controller 102 outputs the turn-off signal 32 to control K2 to be turned off. Finally, the controller 102 outputs the turn-off signal 33 to control K3 and K4 to be simultaneously turned off, that is, performs linkage control on K3 and K4.

Although the turn-on signals and the turn-off signals in FIG. 10 and FIG. 11 are different, the signals may correspond to same hardware interfaces. For example, connection relationships between the controller 102 and the switching device include three interfaces, for example, I/O interfaces. The three interfaces of the controller 102 output high levels when the relays are controlled to be turned on, and the three interfaces output low levels when the relays are controlled to be turned off. Further, the interfaces may be other output interfaces of the controller 102, for example, pulse drive signal pins.

In addition, to precisely control a turn-off moment of the relay, a turn-off delay time of the relay may be considered. The relay may be controlled to turn off based on a time obtained after the turn-off delay time of the relay is deducted from the zero-crossing moment of the current of the phase. This can ensure that the relay is turned off at an actual zero-crossing moment of the current, thereby reducing a turn-off loss and ensuring that the relay is successfully turned off without contact adhesion.

Currents in the three phases may be collected and the zero-crossing moments of the currents may be obtained by using current sampling signals to determine zero-crossing moments of currents.

A turn-off delay time may need to be tested according to an actual application scenario and relay type selection, and set based on an empirical value obtained during the test. Because the turn-off delay time of the relay is related to a current ambient temperature, a drive signal of the relay, and the like, no fixed turn-off delay time can be set. The turn-off delay time may be affected by both a temperature change and a drive signal change.

In all the foregoing embodiments, N switches in the second-stage switching device are integrated in one housing. For example, when N is 3, three relays included in the second-stage switching device are all located in one housing and controlled by one control signal. N switches included in the first-stage switching device are separately disposed. For example, three relays included in the first-stage switching device are separately disposed and each is controlled by using one independent control signal. For a case of two phases, N is 2. Two relays included in the second-stage switching device are both located in one housing and controlled by one control signal. Two relays included in the first-stage switching device are separately disposed and each is controlled by using one independent control signal. In addition, the N switches in the first-stage switching device may alternatively be integrated inside one housing, but N corresponding independent control signals are required to control the switches.

In conclusion, the power converter provided in this embodiment may need to use N+1 control signals to separately control 2N switching devices of N phases. In this way, the switching devices can be controlled sequentially to prolong their service lives, and a quantity of control signals can be minimized to improve control stability.

Power Converter Embodiment 4

Figure 12:
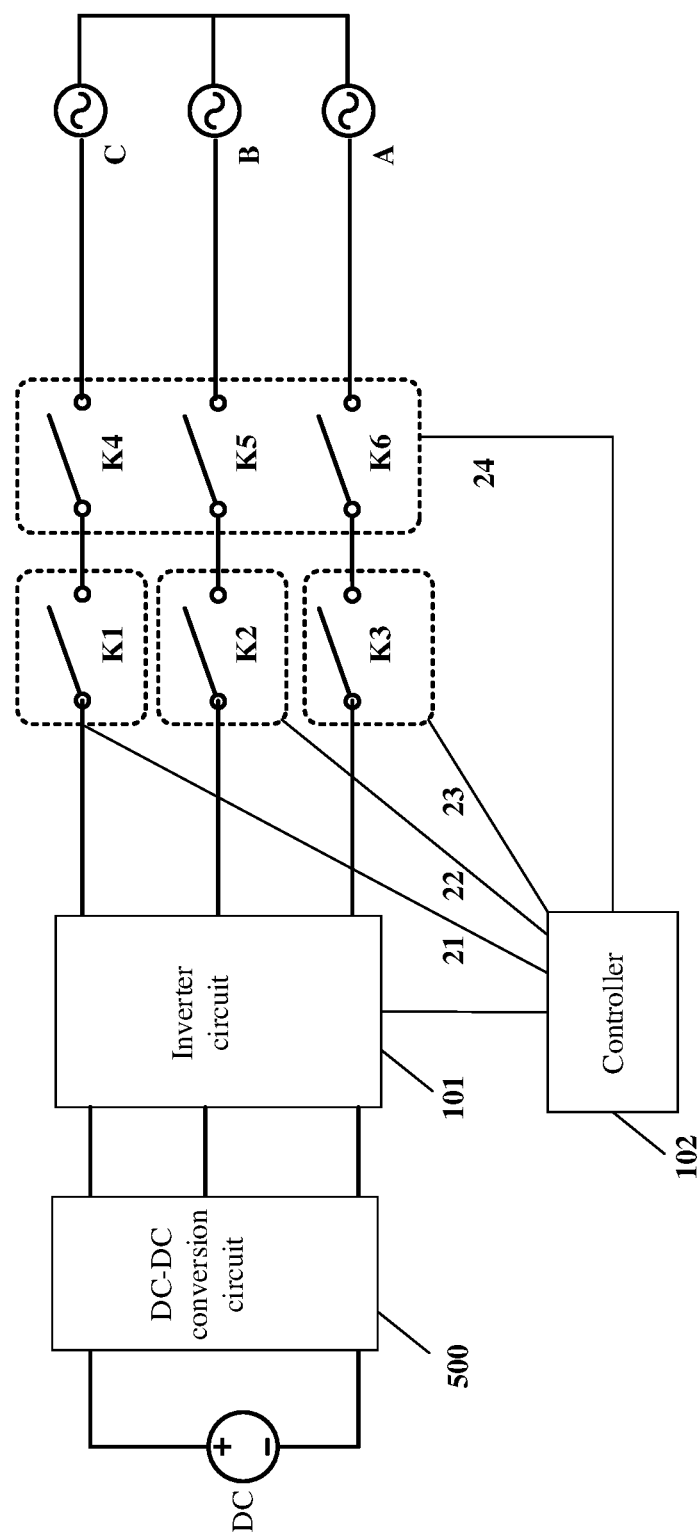
FIG. 12 is a schematic diagram of an inverter including a DC-DC conversion circuit according to an embodiment.

The foregoing description is merely provided from an input end of an inverter circuit. In the schematic diagrams corresponding to the foregoing embodiments, the input end of the inverter circuit may be directly connected to a photovoltaic array; or the input end of the inverter circuit may be directly connected to a DC-DC conversion circuit, and then an input end of the DC-DC conversion circuit is connected to a photovoltaic array. The following first uses a three-phase inverter as an example. FIG. 12 is a schematic diagram of an inverter including a DC-DC conversion circuit.

An input end of a DC-DC conversion circuit 500 is connected to a direct current power supply.

An output end of the DC-DC conversion circuit 500 is connected to an input end of an inverter circuit 102.

Figure 13:
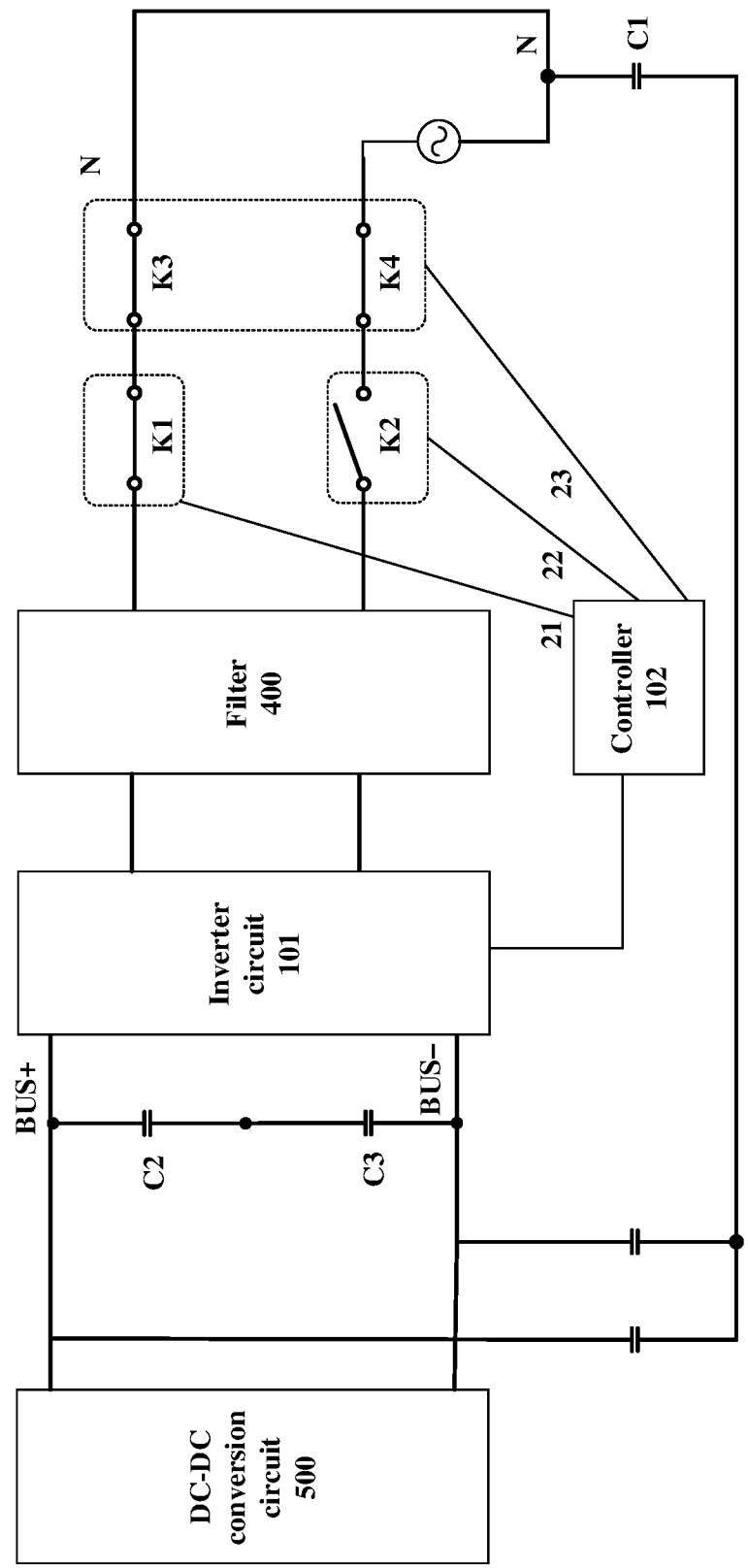
FIG. 13 is a schematic diagram of a two-phase inverter including a DC-DC conversion circuit according to an embodiment.

Similarly, FIG. 13 is a schematic diagram of a two-phase inverter including a DC-DC conversion circuit.

Photovoltaic Power Generation System Embodiment

Based on the power converter provided in the foregoing embodiments, this embodiment may further provide a photovoltaic power generation system, which includes the power converter described in the foregoing embodiments, and further includes a photovoltaic array. The following describes the photovoltaic power generation system in detail with reference to the accompanying drawings.

Figure 14:
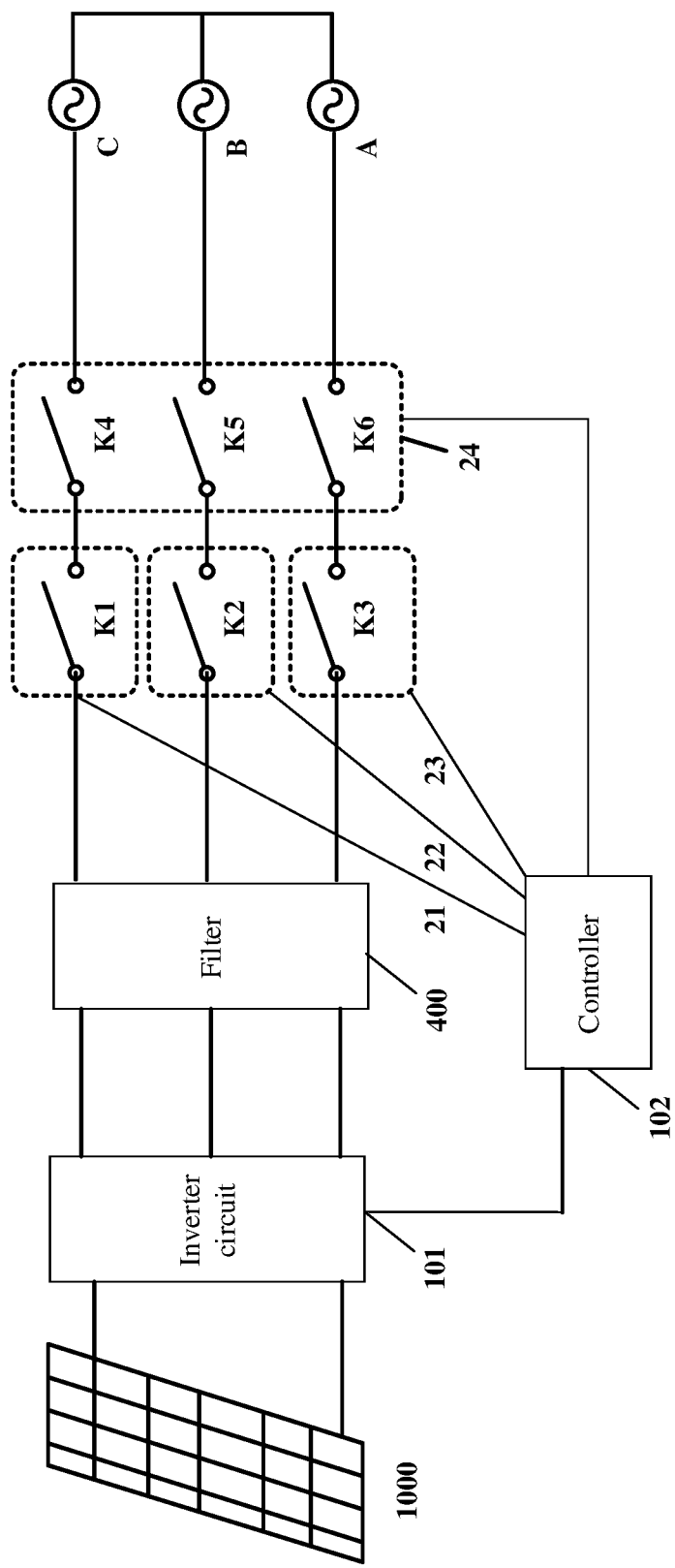
FIG. 14 is a schematic diagram of a photovoltaic system corresponding to a single-stage inverter according to an embodiment.

FIG. 14 is a schematic diagram of a photovoltaic power generation system corresponding to a single-stage power converter according to an embodiment.

The following still uses a three-phase power converter and a three-phase power grid as an example for description. The description is provided by using an example in which a power conversion circuit included in the power converter is an inverter circuit. The inverter circuit may work bidirectionally, may implement inversion in a forward direction and rectification in a reverse direction. In the field of photovoltaic power generation technologies, when the inverter circuit works to implement rectification in the reverse direction, an alternating current of the alternating current power grid may be rectified into a direct current to charge an energy storage device.

An input end of an inverter circuit 101 is connected to a photovoltaic array 1000. The photovoltaic array 1000 provides a direct current power supply for the inverter circuit 101. The inverter circuit 101 may invert a direct current output by the photovoltaic array 1000 into an alternating current and feedback the alternating current to the three-phase alternating current power grid.

For a manner in which a controller 102 in the power converter controls a switching device, refer to the descriptions in the foregoing embodiments. Details are not described herein again.

In the photovoltaic power generation system provided in this embodiment, turn-on of the switching device, for example, a relay, can be effectively controlled. Therefore, service lives of the relays can be prolonged. In addition, when the relays need to be turned off, turn-off times of the relays can be precisely controlled, thereby ensuring that the relays are effectively turned off without contact adhesion and reducing switch damage on the relays.

Figure 15:
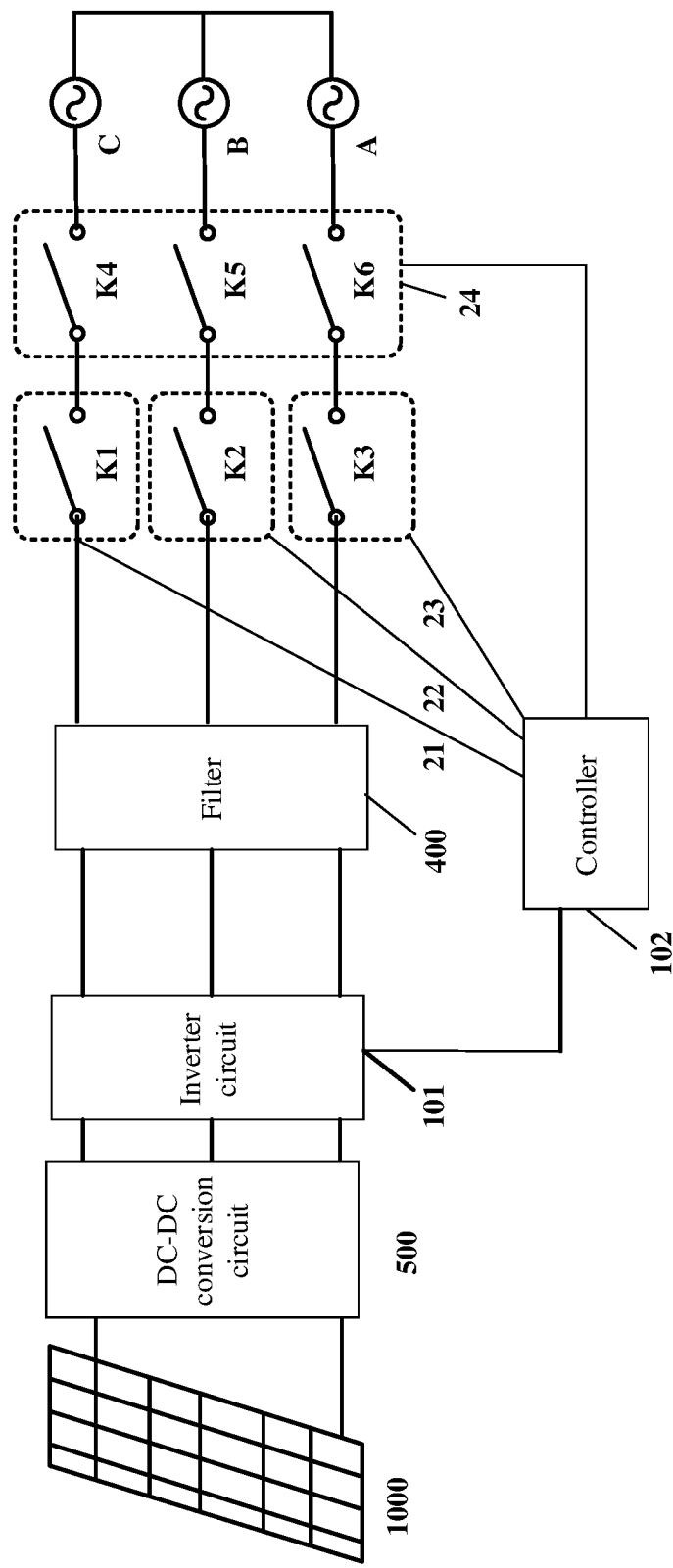
FIG. 15 is a schematic diagram of a photovoltaic system corresponding to a two-stage inverter according to an embodiment.

FIG. 15 is a schematic diagram of a photovoltaic power generation system corresponding to a two-stage power converter according to an embodiment.

A difference between the photovoltaic power generation systems shown in FIG. 15 and FIG. 14 lies in that: The power converter includes a DC-DC conversion circuit 500 and an inverter circuit 101, and an input end of the DC-DC conversion circuit 500 is connected to a photovoltaic array 1000.

It should be understood that all the foregoing figures are for illustration purposes. To increase a power of an alternating current fed back to the power grid, a plurality of DC-DC conversion circuits may be connected in parallel to an input end of the inverter circuit, and an input end of each DC-DC conversion circuit is connected to a different photovoltaic array.

In addition, when the plurality of DC-DC conversion circuits may be connected in parallel, the plurality of DC-DC conversion circuits may be located inside a combiner box.

In this embodiment, a form of the DC-DC conversion circuit is not limited. For example, the DC-DC conversion circuit may be a boost circuit, a buck circuit, or a buck-boost circuit.

The inverter circuit may be a two-level inverter circuit or a multi-level inverter circuit, for example, a three-level inverter circuit, provided that a quantity of levels of the DC-DC conversion circuit is the same as a quantity of levels of the inverter circuit.

Method Embodiment

Based on the power converter and the photovoltaic power generation system provided in the foregoing embodiments, this embodiment may further provide a method for controlling an action of a switching device. The following describes the method in detail with reference to the accompanying drawings.

In the following embodiment, an example in which a power conversion circuit in a power converter is an inverter circuit is used for description. The inverter circuit may be a bidirectional conversion circuit and may implement an inversion function in a forward direction and a rectification function in a reverse direction.

Figure 16:
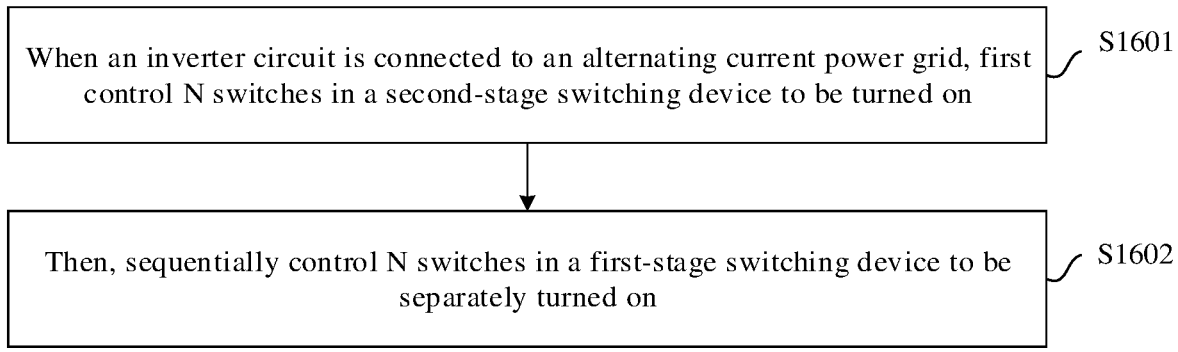
FIG. 16 is a flowchart of a method for turning on a switching device according to an embodiment.

FIG. 16 is a flowchart of a method for turning on a switching device according to an embodiment.

The method for controlling an action of a switching device provided in this embodiment is applied to the power converter provided in the foregoing embodiments. The power converter includes an inverter circuit and a switching device. The power converter includes N phases, where N is 2 or 3. In other words, the power converter may be two-phase or three-phase. An output end of the inverter circuit is connected to an alternating current power grid through a first-stage switching device and a second-stage switching device that are connected in series. The switching device includes the following two stages: a first-stage switching device and a second-stage switching device. The first-stage switching device and the second-stage switching device may separately include N switches, may include 2N switches in total, or may include four switches in case of two phases and six switches in case of three phases.

The method includes the following steps.

S1601: When the inverter circuit is connected to the alternating current power grid, first control the N switches in the second-stage switching device to be turned on.

S1602: Then, sequentially control the N switches in the first-stage switching device to be separately turned on.

The sequentially controlling the N switches in the first-stage switching device to be separately turned on may include:

when the inverter circuit is connected to the alternating current power grid this time, changing a sequence of separately turning on the N switches in the first-stage switching device.

The foregoing describes how to control the switching device to turn on when the inverter circuit is controlled to be connected to the power grid. The following describes how to control the switching device to turn off when the inverter circuit is disconnected from the power grid. For example, it is determined whether a short circuit fault occurs at an input end or the output end of the inverter circuit. For example, whether a short circuit to ground fault occurs at an input end BUS– of the inverter circuit may be determined based on a detection voltage. The detection voltage may be compared with a preset voltage threshold. When the detection voltage is less than the preset voltage threshold, it indicates that a short circuit fault occurs. In addition, whether a short circuit fault occurs may alternatively be determined based on a detection current. For example, the detection current is compared with a preset current threshold. When the detection current is greater than the preset current threshold, it indicates that a short circuit fault occurs.

If it is determined that a short circuit occurs, the inverter circuit needs to be controlled to be disconnected from the alternating current power grid.

Figure 17:
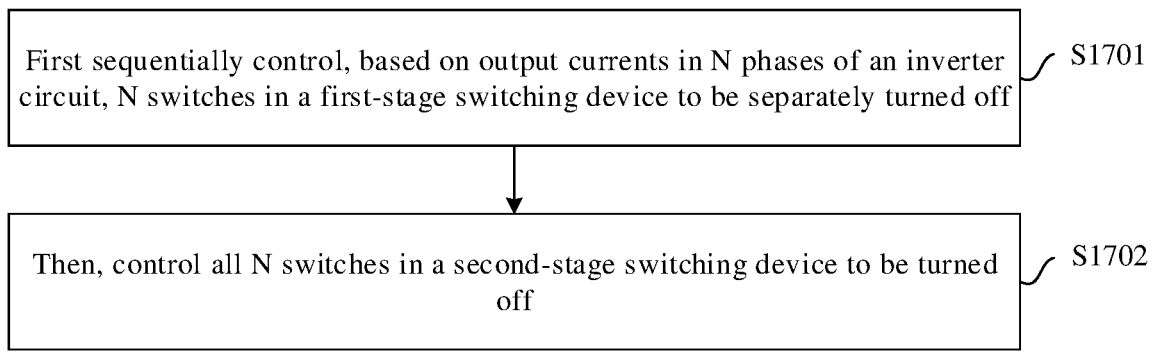
FIG. 17 is a flowchart of a method for turning off a switching device according to an embodiment.

FIG. 17 is a flowchart of a method for turning off a switching device according to an embodiment.

When the inverter circuit is disconnected from the alternating current power grid, the following control manner may be used.

S1701: First sequentially control, based on output currents in the N phases of the inverter circuit, the N switches in the first-stage switching device to be separately turned off.

S1702: Then, control all the N switches in the second-stage switching device to be turned off.

For reliable turn-off of the switching device without contact adhesion, it is necessary to detect a zero-crossing moment of a current in each phase. The sequentially controlling the N switches in the first-stage switching device to be separately turned off may include:

at a zero-crossing moment of a current in an $i^{th}$ phase in the output currents in the N phases of the inverter circuit, controlling a switch in the $i^{th}$ phase in the first-stage switching device to be turned off, where i=1, . . . , or N.

For example, if a current in a phase A crosses zero first, a switching device in the phase A is controlled to turn off first, following by a switching device in a phase B and finally a switching device in a phase C.

In addition, to precisely control the switching device to be turned off at the zero-crossing moment of the current in each phase, a turn-off delay of the switching device is considered. In other words, a preset turn-off delay time is specified.

The controlling a switch in the $i^{th}$ phase in the first-stage switching device to be turned off may include:

based on a preset turn-off delay time and the zero-crossing moment of the current in the $i^{th}$ phase, outputting a turn-off drive signal to the switch in the $i^{th}$ phase in the first-stage switching device, where the turn-off drive signal is used to turn off the switch in the $i^{th}$ phase.

Currents in the three phases may be collected and the zero-crossing moments of the currents may be obtained by using current sampling signals, to determine zero-crossing moments of currents. The zero-crossing moments of the currents may be determined by using a hardware circuit or software. This is not limited herein.

According to the method, the switches in the N phases are not controlled as a whole at a time. In addition, to reduce control difficulty and improve controllability, a quantity of control signals is minimized, to effectively balance decentralized and independent control on the switching devices and reliability, because a larger quantity of control signals leads to higher vulnerability to interference and lower stability. In the embodiments, the switching devices may be controlled as decentrally as possible while stability and controllability are ensured, thereby resolving the problem of a current shock occurring simultaneously in the switching devices in the three phases. When the switching device needs to be turned on, all the relays in the second-stage switching device are controlled to turn on in a linkage manner, and then the relays in the first-stage switching device are controlled one by one. When the power converter needs to be disconnected from the power grid, the relays in the first-stage switching device are controlled to turn off one by one, and then all the relays in the second-stage switching device are controlled to be simultaneously turned off in a linkage manner.

Apparatus Embodiment

Based on the power converter, the photovoltaic power generation system, and the method provided in the foregoing embodiments, this embodiment may further provide an apparatus for controlling an action of a switching device. The following describes the apparatus in detail with reference to the accompanying drawings.

Figure 18:
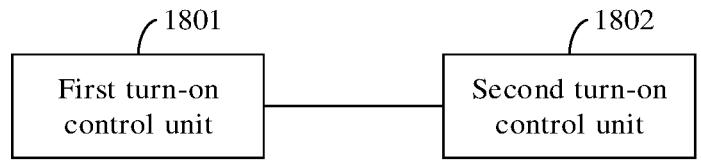
FIG. 18 is a schematic diagram of an apparatus for controlling an action of a switching device according to an embodiment.

FIG. 18 is a schematic diagram of an apparatus for controlling an action of a switching device according to an embodiment.

The apparatus for controlling an action of a switching device provided in this embodiment is applied to a power converter. The power converter includes a power conversion circuit and a switching device. The switching device includes a first-stage switching device and a second-stage switching device. The power converter includes N phases, where N is 2 or 3. An output end of the power conversion circuit is connected to an alternating current power grid through the first-stage switching device and the second-stage switching device that are connected in series. The first-stage switching device and the second-stage switching device separately include N switches.

The apparatus includes a first turn-on control unit 1801 and a second turn-on control unit 1802.

The first turn-on control unit 1801 is configured to: when the power conversion circuit is connected to the alternating current power grid, first control the N switches in the second-stage switching device to be simultaneously turned on.

The second turn-on control unit 1802 is configured to: after the N switches in the second-stage switching device are simultaneously turned on, sequentially control the N switches in the first-stage switching device to be turned on one by one.

The second turn-on control unit includes a replacement subunit.

The replacement subunit is configured to: when the power conversion circuit is connected to the alternating current power grid this time, change a sequence of separately turning on the N switches in the first-stage switching device.

The apparatus provided in this embodiment further includes a first turn-off control unit and a second turn-off control unit.

The first turn-off control unit is configured to: when the power conversion circuit is disconnected from the alternating current power grid, first sequentially control, based on output currents in the N phases of the power conversion circuit, the N switches in the first-stage switching device to be separately turned off.

The second turn-off control unit is configured to: after the N switches in the first-stage switching device are all turned off, control the N switches in the second-stage switching device to be simultaneously turned off.

The first turn-off control unit may include a current detection subunit and a turn-off control subunit.

The current detection subunit is configured to detect a zero-crossing moment of a current in an $i^{th}$ phase in the output currents in the N phases of the power conversion circuit.

The turn-off control subunit is configured to: when the current detection subunit detects the zero-crossing moment of the current in the $i^{th}$ phase in the output currents in the N phases of the power conversion circuit, control a switch in the $i^{th}$ phase in the first-stage switching device to be turned off, where i=1, . . . , or N.

The turn-off control subunit may be configured to: based on a preset turn-off delay time and the zero-crossing moment of the current in the $i^{th}$ phase, output a turn-off signal to the switch in the $i^{th}$ phase in the first-stage switching device, where the turn-off signal is used to turn off the switch in the $i^{th}$ phase.

The apparatus provided in this embodiment further includes a determining unit, configured to determine whether a short circuit fault occurs at an input end or the output end of the power conversion circuit. If a short circuit fault occurs at the input end or the output end of the power conversion circuit, the first turn-off control unit and the second turn-off control unit control the power conversion circuit to be disconnected from the alternating current power grid.

In the embodiments, "first" and "second" are used for differentiation, and do not indicate an order or a meaning.

It should be understood that "at least one piece (item)" means one or more, and "a plurality of" means two or more. The term "and/or" is used to describe an association relationship between associated objects, and represents that three relationships may exist. For example, "A and/or B" may represent the following three cases: only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent: a, b, c, "a and b", "a and c", "b and c", or "a, b, and c", where a, b, and c may be singular or plural.

The foregoing descriptions are merely embodiments, but are not intended to limit. Although the embodiments are described above, these embodiments are not intended as limiting. By using the method above, any person of ordinary skill in the art can make a plurality of possible changes and modifications without departing from the scope of the embodiments. Therefore, any simple amendments, equivalent variations, and modifications made on the above embodiments shall fall within the scope of the embodiments.

What is claimed is:

1. A power converter, comprising:
a power conversion circuit, wherein the power converter comprises N phases and N is either 2 or 3;
a switching device,
and a controller, wherein
an input end of the power conversion circuit is configured to connect to a direct current power supply, and the power conversion circuit is configured to convert a direct current output by the direct current power supply into an alternating current;
the switching device comprises at least the following two stages: a first-stage switching device and a second-stage switching device, wherein the first-stage switching device and the second-stage switching device separately comprise N switches, and the N switches are connected in series to the N phases respectively;
an output end of the power conversion circuit is connected to an alternating current power grid through the first-stage switching device and the second-stage switching device that are connected in series; and the controller is configured to:
when the power conversion circuit is connected to the alternating current power grid, first control the N switches in the second-stage switching device to be simultaneously turned on, and then sequentially control the N switches in the first-stage switching device to be turned on one by one.

2. The power converter according to claim 1, wherein the controller is further configured to:
output a first turn-on signal to control the N switches in the second-stage switching device to be simultaneously turned on and then sequentially
output a second turn-on signal to an $(N+1)^{th}$ turn-on signal to control the N switches in the first-stage switching device to be turned on one by one.

3. The power converter according to claim 1, wherein, when the power conversion circuit is connected to the alternating current power grid, the controller is further configured to change a sequence of turning on the N switches in the first-stage switching device one by one.

4. The power converter according to claim 1, wherein the controller is further configured to:
when the power conversion circuit is disconnected from the alternating current power grid, first control, respectively based on output currents in the N phases of the power conversion circuit, the N switches in the first-stage switching device to be turned off one by one, and then control the N switches in the second-stage switching device to be simultaneously turned off.

5. The power converter according to claim 4, wherein the controller is further configured to:
sequentially output a first turn-off signal to an $N^{th}$ turn-off signal to control respectively the N switches in the first-stage switching device to be turned off one by one, and then
output an $(N+1)^{th}$ turn-off signal to control the N switches in the second-stage switching device to be simultaneously turned off.

6. The power converter according to claim 5, wherein the controller is further configured to:
at a zero-crossing moment of a current in an $i^{th}$ phase in the output currents in the N phases of the power conversion circuit, control a switch in the $i^{th}$ phase in the first-stage switching device to be turned off, wherein i is a positive integer less than or equal to N.

7. The power converter according to claim 6, wherein the controller is further configured to:
output, based on a preset turn-off delay time for the first-stage switching device and the zero-crossing moment of the current in the $i^{th}$ phase, a turn-off signal to the switch in the $i^{th}$ phase in the first-stage switching device, wherein the turn-off signal is used to turn off the switch in the $i^{th}$ phase.

8. The power converter according to claim 4, wherein the controller is further configured to:
when it is determined that a short circuit fault occurs at the input end or the output end of the power conversion circuit, control the power conversion circuit to be disconnected from the alternating current power grid.

9. The power converter according to claim 1, wherein the N switches in the second-stage switching device are integrated in one housing; and
the N switches in the first-stage switching device are separately disposed.

10. The power converter according to claim 1, further comprising:

a DC-DC conversion circuit, wherein
an input end of the DC-DC conversion circuit is connected to the direct current power supply; and
an output end of the DC-DC conversion circuit is connected to the input end of the power conversion circuit.

11. A photovoltaic power generation system, comprising:
a photovoltaic array; and
a power converter comprising a power conversion circuit, a switching device, and a controller, wherein
the power converter comprises N phases, wherein N is 2 or 3;
an input end of the power conversion circuit is configured to connect to a direct current power supply, and the power conversion circuit is configured to convert a direct current output by the direct current power supply into an alternating current;
the switching device comprises at least the following two stages: a first-stage switching device and a second-stage switching device, wherein the first-stage switching device and the second-stage switching device separately comprise N switches, and the N switches are connected in series to the N phases respectively;
an output end of the power conversion circuit is connected to an alternating current power grid through the first-stage switching device and the second-stage switching device that are connected in series; and
the controller is configured to:
when the power conversion circuit is connected to the alternating current power grid, first control the N switches in the second-stage switching device to be simultaneously turned on, and then sequentially control the N switches in the first-stage switching device to be turned on one by one;
wherein the photovoltaic array is connected to an input end of the power converter.

12. The power converter according to claim 11, wherein the controller is further configured to:
output a first turn-on signal to control the N switches in the second-stage switching device to be simultaneously turned on and then sequentially
output a second turn-on signal to an $(N+1)^{th}$ turn-on signal to control the N switches in the first-stage switching device to be turned on one by one.

13. The power converter according to claim 11, when the power conversion circuit is connected to the alternating current power grid, the controller is further configured to:
change a sequence of turning on the N switches in the first-stage switching device one by one.

14. The power converter according to claim 11, wherein the controller is further configured to:
when the power conversion circuit is disconnected from the alternating current power grid, first control, respectively based on output currents in the N phases of the power conversion circuit, the N switches in the first-stage switching device to be turned off one by one, and then
control the N switches in the second-stage switching device to be simultaneously turned off.

15. A method for controlling an action of a switching device, applied to a power converter, wherein the power converter comprises a power conversion circuit and a switching device; the switching device comprises at least a first-stage switching device and a second-stage switching device; the power converter comprises N phases, wherein N is 2 or 3; an output end of the power conversion circuit is connected to an alternating current power grid through the first-stage switching device and the second-stage switching device that are connected in series; and the first-stage switching device and the second-stage switching device separately comprise N switches; and the method comprises:
when the power conversion circuit is connected to the alternating current power grid, first controlling the N switches in the second-stage switching device to be simultaneously turned on; and
then sequentially controlling the N switches in the first-stage switching device to be turned on one by one.

16. The method for controlling an action of a switching device according to claim 15, wherein sequentially controlling the N switches in the first-stage switching device to be turned on one by one further comprises:
when the power conversion circuit is connected to the alternating current power grid, changing a sequence of turning on the N switches in the first-stage switching device one by one.

17. The method for controlling an action of a switching device according to claim 15, further comprising:
when the power conversion circuit is disconnected from the alternating current power grid, first sequentially controlling, based on output currents in the N phases of the power conversion circuit, the N switches in the first-stage switching device to be turned off one by one, and then controlling the N switches in the second-stage switching device to be simultaneously turned off.

18. The method for controlling an action of a switching device according to claim 17, wherein sequentially controlling the N switches in the first-stage switching device to be turned off one by one further comprises:
at a zero-crossing moment of a current in an $i^{th}$ phase in the output currents in the N phases of the power conversion circuit, controlling a switch in the $i^{th}$ phase in the first-stage switching device to be turned off, wherein i is a positive integer less than or equal to N.

19. The method for controlling an action of a switching device according to claim 18, wherein controlling the switch in the $i^{th}$ phase in the first-stage switching device to be turned off further comprises:
based on a preset turn-off delay time for the first-stage switching device and the zero-crossing moment of the current in the $i^{th}$ phase, outputting a turn-off signal to the switch in the $i^{th}$ phase in the first-stage switching device, wherein the turn-off signal is used to turn off the switch in the $i^{th}$ phase.

20. The method for controlling an action of a switching device according to claim 17, further comprising:
determining whether a short circuit fault occurs at an input end or the output end of the power conversion circuit; and if a short circuit fault occurs at the input end or the output end of the power conversion circuit, controlling the power conversion circuit to be disconnected from the alternating current power grid.

\* \* \* \* \*